US008929657B2

(12) United States Patent
Jung

(10) Patent No.: US 8,929,657 B2
(45) Date of Patent: Jan. 6, 2015

(54) SYSTEM AND METHOD FOR INDEXING OBJECT IN IMAGE

(75) Inventor: Tae Woo Jung, Seoul (KR)

(73) Assignee: KyongHee Yi, (Ssangmun-dong), Dobong-gu, Seoul (KR)

( * ) Notice: Subject to any disclaimer, the term of this patent is extended or adjusted under 35 U.S.C. 154(b) by 985 days.

(21) Appl. No.: 13/060,015

(22) PCT Filed: Aug. 22, 2009

(86) PCT No.: PCT/KR2009/004692
§ 371 (c)(1),
(2), (4) Date: Apr. 22, 2011

(87) PCT Pub. No.: WO2010/021527
PCT Pub. Date: Feb. 25, 2010

(65) Prior Publication Data
US 2012/0128241 A1 May 24, 2012

(30) Foreign Application Priority Data

Aug. 22, 2008 (KR) .................. 10-2008-0082573

(51) Int. Cl.
G06K 9/00 (2006.01)
G11B 27/11 (2006.01)
G06F 17/30 (2006.01)
G11B 27/32 (2006.01)
H04N 21/2343 (2011.01)
H04N 21/235 (2011.01)
H04N 21/278 (2011.01)
H04N 21/435 (2011.01)
H04N 21/44 (2011.01)
H04N 21/4722 (2011.01)
H04N 21/4725 (2011.01)
H04N 21/84 (2011.01)

(52) U.S. Cl.
CPC .......... *G11B 27/11* (2013.01); *G06F 17/30855* (2013.01); *G06K 9/00711* (2013.01); *G11B 27/32* (2013.01); *H04N 21/234318* (2013.01); *H04N 21/235* (2013.01); *H04N 21/278* (2013.01); *H04N 21/435* (2013.01); *H04N 21/44008* (2013.01); *H04N 21/4722* (2013.01); *H04N 21/4725* (2013.01); *H04N 21/84* (2013.01)
USPC ............ 382/173; 382/164; 382/165; 382/190

(58) Field of Classification Search
None
See application file for complete search history.

(56) References Cited

U.S. PATENT DOCUMENTS

2005/0071283 A1* 3/2005 Randle et al. .................... 705/75
2009/0190830 A1* 7/2009 Hasegawa ..................... 382/165

(Continued)

FOREIGN PATENT DOCUMENTS

WO WO2010/021527 2/2010

Primary Examiner — Sean Motsinger
(74) Attorney, Agent, or Firm — John K. Park; Park Law Firm

(57) ABSTRACT

The present invention relates to a system for providing a supplementary service by identifying an object in an image and comprises: an image service server and a user terminal. The image service server provides image information and includes a database that manages metadata for the provision of the service. The user terminal dynamically generates control command information according to the information for the object selected in the image. In addition, the user terminal receives the information for the object selected in the image that is displayed on screen and transfers the information to the image service server. Furthermore, the user terminal receives from the image service server the preset supplementary service that corresponds to the information for the object selected.

41 Claims, 32 Drawing Sheets

(56) References Cited

U.S. PATENT DOCUMENTS

| | | | |
|---|---|---|---|
| 2010/0239160 A1* | 9/2010 | Enomoto et al. | 382/165 |
| 2010/0246972 A1* | 9/2010 | Koyama et al. | 382/199 |
| 2011/0255795 A1* | 10/2011 | Nakamura | 382/229 |
| 2012/0226600 A1* | 9/2012 | Dolev | 705/38 |
| 2013/0004076 A1* | 1/2013 | Koo et al. | 382/176 |
| 2013/0182951 A1* | 7/2013 | Shustorovich et al. | 382/167 |
| 2013/0182973 A1* | 7/2013 | Macciola et al. | 382/293 |
| 2013/0202185 A1* | 8/2013 | Irwin et al. | 382/137 |

* cited by examiner

FIG.2

IMAGE MAIN TABLE

| Video_ID (11) | Disp_Size (12) | Run_Time (13) | Cell NO_Depth (14) | Video Title (15) |
|---|---|---|---|---|
| Idx_Term (16) | No._Scenes (17) | No._Frames (18) | Cate_Class_Id (19) | |

~10

SCENE SEGMENTATION TABLE

| Scene_Id (21) | Start Frame (22) | End Frame (23) | Start Frame (24) |
|---|---|---|---|
| Key Object (25) | Object set (71) | Control Command (72) | Scene Context Id (28) |

~20

FRAME TABLE

| Frame_Id (31) | Frame Index (32) | | Frame Time (33) |
|---|---|---|---|
| Object Set (71) | Control Command (72) | Frame Context Id (34) | Service Anchor (73) |

OBJECT TABLE

| Object ID (41) | Object Desctiption (42) | Frame ID (31) | Object Index (43) | | |
|---|---|---|---|---|---|
| Object Pattern (44) | Polygon Ext Type (45) | Control Command (72) | Object Context (45) | Feature Set (75) | Service Anchor (73) |

~40

SUB OBJECT TABLE

| Object Id (41) | Sub Object ID (51) | Sub Id Cell ID(X,Y) (52) |
|---|---|---|
| Control Command (72) | Feature Set (75) | Service Anchor (73) |

~50

INVERSE FRAME OBJECT SET TABLE

| Frame_Id (31) | Control Command (72) | Context Id (34) | Object Abstraction Digest Offset (61) | |
|---|---|---|---|---|
| No of Object (62) | Object Id: Cell ID(X,Y) (63) | Object Id: Cell ID(X,Y) | Object Id: Cell ID(X,Y) | Object ID n: Cell ID M(X,Y) |

CATEGORY TABLE (F10)

| IDENTIFIER | CATEGORY |
|---|---|
| 1 | LIFE |
| 2 | TASTE |
| 3 | LEARNING |

CONTROL COMMAND (F20)

| IDENTIFIER | STATEMENT | COORDINATE INFORMATION | PARAMETER | OPTION |
|---|---|---|---|---|
| 1 | INFORMATION; PURCHASE; VIDEO; ADVERTISEMENT | CELL INFORMATION; CELL REGION INFORMATION | A::B | 1 |
| 2 | INFORMATION; PURCHASE; ADVERTISEMENT | | B::C | 3 |
| 3 | INFORMATION; INFORMATION; SEARCH | | C::D | 2 |

CONTEXT DB (F30)

| IDENTIFIER | FEATURE MATCHING | MATCHING CONDITION | MAIN CONTEXT | SUB CONTEXT |
|---|---|---|---|---|
| 1 | 0x01 | 0x01 | 0x01 | 0x01 |
| 2 | 0x02 | 0x02 | 0x02 | 0x02 |
| 3 | 0x03 | 0x03 | 0x03 | 0x03 |

OBJECT INDEX DB (F40)

| IDENTIFIER | OBJECT IDENTIFIER | CONDITION INFORMATION | SERVICE IDENTIFIER | INDEX WORD | OBJECT CONNECTION |
|---|---|---|---|---|---|
| 1 | 0x01 | 0x01 | 0x0001 | | |
| 2 | 0x02 | 0x02 | 0x0002 | | |
| 3 | 0x03 | 0x03 | 0x0003 | | |

FIG.12
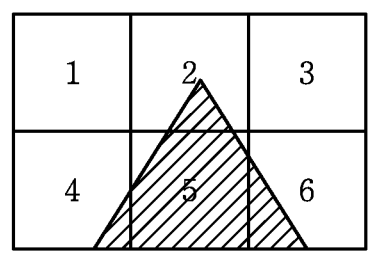
(a)
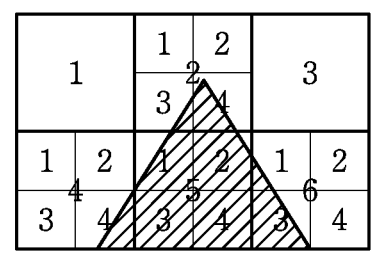
(b)
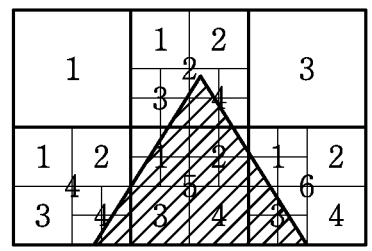
(c)
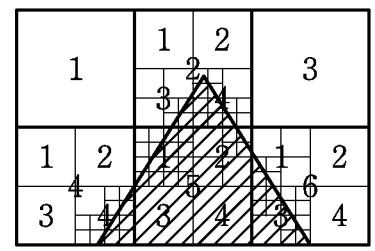
(d)
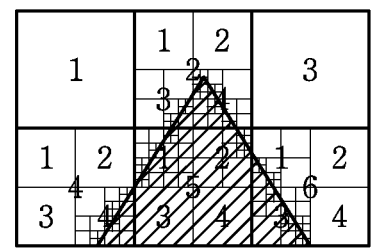
(e)

FIG.13

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 1 | 0 | 0 | 0 | 0 | 0 | 0 |
| 0 | 0 | 0 | 0 | 0 | 0 | 0 | 0 | 1 | 1 | 1 | 0 | 0 | 0 | 0 | 0 |
| 0 | 0 | 0 | 0 | 0 | 0 | 0 | 0 | 1 | 1 | 1 | 0 | 0 | 0 | 0 | 0 |
| 0 | 0 | 0 | 0 | 0 | 0 | 0 | 1 | 1 | 1 | 1 | 1 | 0 | 0 | 0 | 0 |
| 0 | 0 | 0 | 0 | 0 | 0 | 0 | 1 | 1 | 1 | 1 | 1 | 0 | 0 | 0 | 0 |
| 0 | 0 | 0 | 0 | 0 | 0 | 1 | 1 | 1 | 1 | 1 | 1 | 1 | 0 | 0 | 0 |
| 0 | 0 | 0 | 0 | 0 | 0 | 1 | 1 | 1 | 1 | 1 | 1 | 1 | 0 | 0 | 0 |
| 0 | 0 | 0 | 0 | 0 | 1 | 1 | 1 | 1 | 1 | 1 | 1 | 1 | 0 | 0 | 0 |
| 0 | 0 | 0 | 0 | 0 | 1 | 1 | 1 | 1 | 1 | 1 | 1 | 1 | 1 | 0 | 0 |
| 0 | 0 | 0 | 0 | 0 | 1 | 1 | 1 | 1 | 1 | 1 | 1 | 1 | 1 | 0 | 0 |
| 0 | 0 | 0 | 0 | 1 | 1 | 1 | 1 | 1 | 1 | 1 | 1 | 1 | 1 | 1 | 0 |
| 0 | 0 | 0 | 1 | 1 | 1 | 1 | 1 | 1 | 1 | 1 | 1 | 1 | 1 | 1 | 0 |

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 1 | 1 | 1 | 0 | 0 | 0 | 0 | 0 | 0 | 0 | 0 | 0 | 0 | 0 | 0 |
| 10 | 0 | 0 | 0 | 0 | 0 | 0 | 0 | 0 | 1 | 1 | 1 | 1 | 0 | 0 | 0 | 0 | 0 | 0 | 0 | 0 | 0 | 0 | 0 | 0 |
| 11 | 0 | 0 | 0 | 0 | 0 | 0 | 1 | 1 | 1 | 1 | 1 | 1 | 0 | 0 | 0 | 0 | 0 | 0 | 0 | 0 | 0 | 0 | 0 | 0 |
| 12 | 0 | 0 | 0 | 0 | 0 | 1 | 1 | 1 | 1 | 1 | 1 | 1 | 1 | 0 | 0 | 0 | 0 | 0 | 0 | 0 | 0 | 0 | 0 | 0 |
| 13 | 0 | 0 | 0 | 0 | 0 | 0 | 0 | 1 | 1 | 1 | 1 | 1 | 0 | 0 | 0 | 0 | 0 | 0 | 0 | 0 | 0 | 0 | 0 | 0 |
| 14 | 0 | 0 | 0 | 0 | 0 | 0 | 0 | 0 | 1 | 1 | 1 | 1 | 0 | 0 | 0 | 0 | 0 | 0 | 0 | 0 | 0 | 0 | 0 | 0 |
| 15 | 0 | 0 | 0 | 0 | 0 | 0 | 0 | 0 | 1 | 1 | 1 | 1 | 0 | 0 | 0 | 0 | 0 | 0 | 0 | 0 | 0 | 0 | 0 | 0 |
| 16 | 0 | 0 | 0 | 0 | 0 | 0 | 0 | 0 | 1 | 1 | 1 | 1 | 1 | 0 | 0 | 1 | 1 | 1 | 1 | 0 | 0 | 0 | 0 | 0 |
| 17 | 0 | 0 | 0 | 0 | 0 | 0 | 0 | 0 | 1 | 1 | 1 | 1 | 1 | 0 | 0 | 1 | 1 | 0 | 1 | 0 | 0 | 0 | 0 | 0 |
| 18 | 0 | 0 | 0 | 0 | 0 | 1 | 1 | 1 | 1 | 1 | 1 | 1 | 1 | 1 | 0 | 1 | 1 | 1 | 1 | 0 | 0 | 0 | 0 | 0 |
| 19 | 0 | 0 | 0 | 0 | 1 | 1 | 1 | 1 | 1 | 1 | 1 | 1 | 1 | 1 | 0 | 1 | 1 | 1 | 1 | 1 | 1 | 1 | 1 | 1 |
| 20 | 0 | 0 | 0 | 1 | 1 | 1 | 1 | 1 | 1 | 1 | 1 | 1 | 0 | 1 | 0 | 1 | 1 | 1 | 1 | 1 | 1 | 1 | 1 | 1 |
| 21 | 0 | 0 | 1 | 1 | 1 | 1 | 1 | 1 | 1 | 1 | 1 | 1 | 0 | 1 | 0 | 1 | 1 | 1 | 1 | 1 | 0 | 1 | 1 | 1 |
| 22 | 0 | 0 | 1 | 1 | 1 | 0 | 1 | 1 | 1 | 0 | 1 | 1 | 0 | 1 | 1 | 0 | 1 | 1 | 1 | 1 | 1 | 1 | 0 | 1 |
| 23 | 0 | 1 | 1 | 1 | 0 | 1 | 1 | 1 | 1 | 0 | 1 | 1 | 0 | 1 | 1 | 0 | 1 | 1 | 1 | 1 | 1 | 1 | 1 | 0 |
| 24 | 1 | 1 | 1 | 0 | 1 | 1 | 1 | 1 | 1 | 0 | 1 | 1 | 0 | 1 | 1 | 0 | 1 | 1 | 1 | 1 | 1 | 1 | 1 | 1 |

FIG. 31

| DATA FRAME IDENTIFIER | DATA FRAME SEQUENCE NO. | |
|---|---|---|
| FRAME SIZE/FRAME | NUMBER OF FRAMES | |
| FRAME ANCHOR (BYTE ORDER) | INDIVIDUAL DATA FRAME SIZE | SUPPLEMENTARY INFORMATION |
| FRAME/TIME IDENTIFIER | SEQUENCE NO. | |
| OBJECT INDEX COORDINATE INFORMATION | NUMBER OF OBJECT IDENTIFICATION | |
| OBJECT IDENTIFIER/ COORDINATE | SERVICE INFORMATION | SUPPLEMENTARY INFORMATION |
| OBJECT IDENTIFIER/ COORDINATE | SERVICE INFORMATION | SUPPLEMENTARY INFORMATION |
| DATA FRAME DIVISION FIELD | | |
| FRAME/TIME IDENTIFIER | SEQUENCE NO. | |
| OBJECT INDEX COORDINATE INFORMATION | NUMBER OF OBJECT IDENTIFICATION | |
| OBJECT IDENTIFIER/ COORDINATE | SERVICE INFORMATION | SUPPLEMENTARY INFORMATION |
| OBJECT IDENTIFIER/ COORDINATE | SERVICE INFORMATION | SUPPLEMENTARY INFORMATION |
| DATA FRAME DIVISION FIELD | | |

SYSTEM AND METHOD FOR INDEXING OBJECT IN IMAGE

CROSS-REFERENCE TO RELATED APPLICATION

This application claims the benefit of Korean Application No. 10-2008-0082573, filed on Aug. 22, 2008, with the Korean Intellectual Property Office, the disclosure of which is incorporated herein by reference.

TECHNICAL FIELD

This invention relation relates generally to an image processing method, and more particularly, to a system and method for indexing objects in an image and providing supplementary services by identifying objects in an image constituting a plurality of image frames.

BACKGROUND ART

With advance and popularization of communication technologies, communication lines have been constructed from door to door, thereby allowing users to access intended Internet web sites anytime, if necessary, in order to get desired information. This encourages service providers to use Internet for marketing by delivering information such as advertisements and so on through Internet.

Furthermore, as display apparatuses such as televisions and so on have communication capabilities themselves or through an external device (for example, a set-top box or the like), the display apparatuses, as well as computers, have two-way communication capabilities, thereby allowing service providers to utilize display apparatuses as one marketing tool. That is, service providers propose ways to utilize the display apparatuses for marketing of desired products by adding product information to broadcasting signals received by the display apparatuses and allowing users to select the product information.

The conventional product information provision method using broadcasting signals has employed the scheme which provides viewers with product information included in image information to be broadcast by allowing users to recognize an object as a target product from the image information, input the product information separately, and transmit the product information along with the image information. That is, this conventional method requires person's intervention for recognition of an object with product information needed among objects included in a particular image.

This may result in troublesomeness of repetitive image listening by users for recognition of the object included in the particular image. In addition, since a target product is determined based on a subjective judgment of a person who attempts to input product information, it is difficult to provide objective analysis on objects.

DISCLOSURE

Technical Problem

It is therefore an object of the present invention to provide a system and method for indexing objects in an image and providing supplementary services by identifying objects in an image constituting a plurality of image frames.

It is another object of the present invention to provide a system and method for indexing objects in an image, which is capable of determining an object at a position on a display device designated by a viewer irrespective of a resolution and screen size of the display device by managing virtual frames and cells used to manage and store relative positions of an object included in an image.

Technical Solution

To achieve the above objects, according to an aspect, the present invention provides a system for providing a supplementary service by identifying an object in an image, including: an image service server which provides image information and includes a database that manages metadata for provision of the service; a user terminal which dynamically generates control command information according to information for an object selected in the image, receives the information for the object selected in the image that is displayed on a screen, transfers the information to the image service server, and receives from the image service server a preset supplementary service that corresponds to the information for the object selected.

Preferably, the image service server include: an input unit which receives the image information; a video conversion unit which encodes or converts the input image information into an appropriate format and stores the encoded or converted image information in an image information storage unit; an information indexing unit which detects object information from the stored image information and matches a frame of image information in the image information storage unit with object region and connection information within the frame; the image information storage unit which stores image information including the object information, cell information which is screen segmentation information of each image, and feature attribute and service link information in an object; an index information management unit which manages a hierarchical relationship between the object information and metadata of the object information; and an object feature registration unit which manages, provides and processes features and attribute values of the object information.

Preferably, the image service server includes: an object feature information management database; an index and service information management database; a service registration unit which connects a variety of services to an image and manages a mapping; a search provision unit which searches the image information storage unit based on a variety of request information; a service request interpretation unit which interprets and processes a service request; a result output unit which extracts and processes a search result to transmit the search result to the user terminal; a network connection unit which provides an interfacing with a communication network; and a control unit which controls operation of the units.

Preferably, the image information storage unit stores object identification information, image identification information including the object, configuration cell information including identification information of each of segmentation cells constituting the object, information on an area, center point coordinate and phase shift, and simple object information including an image attribute.

Preferably, the image information storage unit constructs an object feature database and a process rule database as an electronic dictionary in order to store metadata for the image information and stores simple object metadata information including object identification information, image identification information including the object, classification information of the object, link information of the object, object detailed information and motion information according to an event.

Preferably, the image information storage unit stores image identification information, identification information of a cell which is the unit of screen segmentation for the image, and cell segmentation information including start and end coordinates of a corresponding cell, along with corresponding image information.

Preferably, the image information storage unit stores logical object information including logical object identification information, image identification information including the logical object, classification information of the logical object, identification information about simple objects included in the logical object, and motion information according to an event. Preferably, the information indexing unit detects relative positions of objects included in the image and stores simple object information including positions and image information of the objects represented by cell information.

Preferably, the information indexing unit detects a basic screen size for the image, segments the screen into a plurality of virtual cells based on preset segmentation information, analyzes image information of each of the virtual cells, recognizes a set of adjacent cells of the cells having the same analysis information as one object, and stores recognized simple object information of each of the objects.

Preferably, the information indexing unit connects an index keyword extracted through a language processing and analysis procedure from caption or related document information to a video frame and object information and includes object feature information and semantic information including a corresponding cell.

Preferably, the index information management unit receives simple object associated information from metadata for each simple object and stores hierarchical information including virtual logical objects generated by a simple object hierarchical structure.

Preferably, the metadata of the logical objects include screen pixel position mapping information for the virtual cells of objects, object attribute and feature information of the objects, and feature attribute information required for extraction of linkage information between the objects.

Preferably, the service registration unit generates metadata using image frame analysis image information, detected object cell information, polygon information and object feature information and stores a result of extraction of contexts of objects, frames and scenes.

Preferably, the service request interpretation unit interprets a type of input request information having means of object selection, inquiry input and voice input and performs a procedure of pointing and inquiry word and voice recognition based on a result of the interpretation.

Preferably, the user terminal includes: an image display unit which includes a display screen segmented into cells and outputs the display image information; a search information input unit which provides a plurality of input means; an input information interpretation unit which generates a message data format for input information; an input information generation unit which generates inquiry data for inquiry intention input; a network connection unit which provides an interfacing with a communication network; and a result output unit which outputs a result transmitted from the image service server.

Preferably, the input information input to the input information generation unit includes one or more selected from a group consisting of an image identifier; a frame identifier or time information; cell information of an object position; control command selection information, and binary inquiry input information including key words, voice and images.

Preferably, the system provides a supplementary service related to the object selection information included in the image by inserting a separate input inquiry data frame in the image frame.

Preferably, the input inquiry data frame adds a service profile generation table.

Preferably, the input inquiry data frame is configured to include an object index, a context and a control command.

According to another aspect, the present invention provides a method of indexing objects in an image, including: an image information search step of checking whether or not newly registered image information is present; an image information analysis step of analyzing a video format and screen information for the newly registered image information; an image information indexing step of analyzing image information from the analyzed original image information and indexing extraction information with cell regions; a step of performing an image analysis pre-process through a contour line analysis method to extract a background and contour lines; a step of mapping an object identification region to a virtual cell region based on the extraction; and an object identification step of segmenting the object identification target cell into sub cells and identifying one or more objects included in the original image information.

Preferably, the image information search step includes: checking whether or not there is analysis target image information in an image information repository; checking whether or not an indexing target video is present; and if it is checked that an indexing target video is present, determining whether or not a video format and a codec are supported, selecting a corresponding codec, and analyzing the video.

Preferably, the image information indexing step includes: analyzing an image of a frame extracted from an image; mapping image pixel information to a virtual cell region; analyzing image pixel image information assigned to the virtual cell; and identifying a set of adjacent cells among cells with the same image analysis information as one object.

Preferably, the method further includes: after the identifying step, analyzing the object identification information and indexing the analyzed object identification information as an object; segmenting a scene using analysis information of objects and a background identified using image identification information of an image frame; and storing an analysis result in a storage table.

Preferably, the image information analysis step further includes: detecting a screen size based on pixel information of an image screen; extracting pixel units compatible with segmentation from the screen size including screen width and height based on preset segmentation information; assigning a cell region of a virtual analysis table in order to manage image analysis information; and mapping pixel segmentation information of an image to cell information.

Preferably, the number of segmentation of virtual cell corresponding to the frame is a multiple of an integer.

Preferably, the step of analyzing image pixel image information assigned to the virtual cell further includes: extracting a frame for image analysis according to a predetermined rule; analyzing a pixel coordinate region segmented from the extracted frame using the cell mapping information based on analysis information of color, texture and boundary line; if a plurality of analysis information is present in one selected cell, segmenting the cell into a multiple of two of sub cells; and segmenting and analyzing the sub cells by a specified segmentation depth until a single image analysis attribute is detected.

Preferably, a result of the image analysis is stored as image analysis information of color, texture and boundary line information and single analysis determination information, and is determined as single analysis information even if there exist a plurality of analysis information when the lowest level sub cell analysis approaches a single object determination ratio in the storing procedure.

Preferably, the object identifying step further includes: analyzing any cell information in frame image analysis information; determining whether or not the object is a cell having continuous adjacent planes and has the same image analysis attribute information; extracting a polygon from cell determination information; and analyzing an object attribute from the extracted polygon to determine a simple object.

Preferably, in managing per-frame object identification information, the object identification information in a virtual cell region is stored as binary summary information, and a connection angle between adjacent successive cells and a relative distance between vertexes at which angle variation occurs are calculated for object identification.

Preferably, the image analysis pre-process is analyzed based on one or more selected from a group consisting of a contour line, a texture pattern and a color of a target image.

According to another aspect, the present invention provides A method of indexing objects in an image, including: an image information search step of checking whether or not newly registered image information is present; an image information analysis step of analyzing a video format and screen information for the newly registered image information; an image information indexing step of analyzing image information from the analyzed original image information and indexing extraction information with cell regions; an object identification step of identifying one or more objects included in the original image information based on a constructed polygon model; and a feature provision step of providing an attribute each identified object.

Preferably, the method further includes: after the feature provision step, a service profile generation step of generating a service profile for each object provided with the attribute.

Preferably, the method further includes: after the service profile generation step, a service provision step of searching and providing a corresponding service at a service request for each object for which the service profile is generated.

Preferably, the object feature attribute is one selected from a group consisting of a representative object feature including a unique representative attribute classification of objects, a general attribute feature of a representative object, a relationship attribute feature between objects or between objects and sub objects, a component attribute feature including behavior, time, place, accessory and condition components of objects, and a special feature to define a special or unique attribute value of an object.

Preferably, the feature provision step further includes: providing a representative object feature value, a general attribute feature and a component and relationship feature to analysis object information for an extracted object in a frame and providing a feature in a special feature order if the object needs a special feature; providing a feature value based on index similarity between image analysis information and a polygon; and f a feature valued is provided to all detected objects in the same frame, providing a feature value for a background object.

Preferably, the method further includes: after the step of providing a feature value, determining whether or not the provided feature value is appropriate or a unregistered object; managing the object attribute feature as a pattern of feature set; and processing the feature attribute value to determine the presence of a feature attribute of a detailed item for a corresponding feature classification item.

Preferably, the presence of a feature attribute of a detailed item manages a feature attribute as a binary value.

Preferably, a calculating method based on the feature includes: a step of determining the presence of detailed feature items per object feature classification; a step of applying an association processing rule between objects or between objects and accessory sub objects of the objects; an association rule processing step between a plurality of objects and a plurality of object features; and a situation and event identification step based on a pattern matching calculation rule for a feature pattern between a plurality of objects.

Preferably, a processing rule database for the feature-based calculation sets a feature pattern extraction condition between a plurality of objects, applies a processing algorithm based on an extraction feature pattern in order to analyze an association between attribute features, recognize a situation and process a variety of supplementary services, and defines an algorithm processing generation rule based on a feature pattern condition.

Preferably, the service profile generation step includes motion information for each condition in order to call service call result processing information, motion information and a particular context related to the object detected in the indexing step.

Preferably, a method of constructing the polygon model database includes the steps of: constructing sample data of the polygon by sampling data based on a distance ratio of a contour line to an adjacent face with respect to a center coordinate of a sample; deleting unnecessary data; indexing color and texture information of an object such as skin or hair; and quantizing the constructed data.

Preferably, the object identification step includes: deleting unnecessary data; extracting a contour line of the identified object information; selecting a center coordinate of the object information and extracting a distance ratio of the object center coordinate to an adjacent face; and calculating similarity between a polygon DB and a morpheme.

Advantageous Effects

The present invention has a merit of easy objective analysis for an image. The present invention provides a system and method for indexing objects in an image, which is capable of determining an object at a position on a display device designated by a viewer irrespective of a resolution and screen size of the display device by managing virtual frames and cells used to manage and store relative positions of an object included in an image.

DESCRIPTION OF DRAWINGS

FIGS. 2 and 3 show a frame and object analysis data table according to an embodiment of the invention;

FIGS. 4 and 5 show an object service metadata table and a feature table, respectively, according to an embodiment of the invention;

FIG. 12 is a view showing an example of sub analysis cell process for an object according to an embodiment of the invention;

FIG. 13 is a view showing an example of cell segmentation of a server according to an embodiment of the invention;

FIG. 28 is a view showing per-cell mapping of a region in which an object in an image is identified according to an embodiment of the invention;

FIG. 31 is a view showing a data frame structure inserted in an image frame according to an embodiment of the invention.

MODE FOR INVENTION

Figure 1:
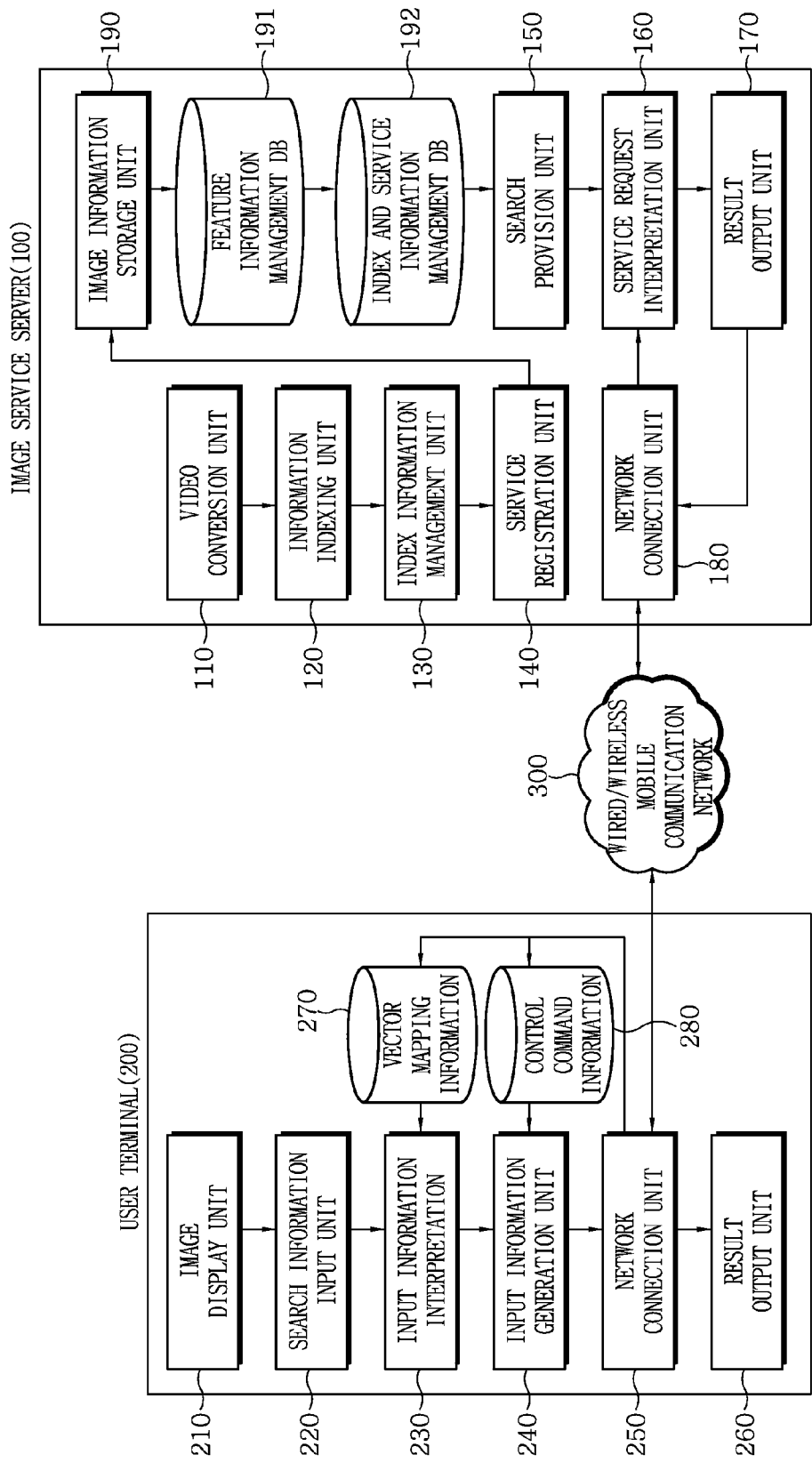
FIG. 1 is a block diagram showing an image service server and a user terminal according to an embodiment of the invention.

For the purpose of achieving the above objects, an object indexing method of the invention includes the steps of: detecting a basic screen size for an image; segmenting a screen into a plurality of virtual cells based on preset segmentation information and setting the segmentation information as cells; analyzing image information of each of the cells and storing cell mapping information and image analysis information; identifying a set of adjacent cells among cells with the same image analysis information as one object; analyzing object identification information and indexing objects based on a result of the analysis; dividing a scene using analysis information of objects and backgrounds identified using image identification information of an image frame; generating an object profile by adding object feature attribute information to the stored object information and providing an associated information search rule; and generating a service profile to provide a variety of dynamic service methods.

In addition, for provision of various supplementary service and search methods in multimedia, the method further includes the steps of: generating a search rule through calculation of attribute information and feature information; inputting search information from a user; interpreting the input search information; and searching and transmitting a service corresponding to the input search information. The present invention also provides an apparatus including a multimedia server and a terminal for provision of the service and a control command interface method for provision of a dynamic interface on a variety of networks including wired/wireless networks.

The detecting step includes detecting a screen size based on pixel information of an image screen extracted as a frame I an image and extracting a pixel unit compatible to the segmentation information from a screen size including screen width and height based on the preset segmentation information.

The step of setting the segmentation information as cells includes mapping pixel coordinate values in a frame assigned to respective cell regions in a process of setting relative segmentation information as cells when pixel information is obtained according to the screen size, where the mapping information of pixel coordinates to the cell regions is set as relative position values.

Preferably, the segmentation process includes segmenting a frame hierarchically and the number of virtual cells is a multiple of two.

Preferably, the segmentation process includes segmenting an image frame into a certain number of virtual cells and each cell is segmented into a multiple of two of sub cells. This cell segmentation process is repeated.

Preferably, each of sub cells into which the cell is segmented is subject to a rule of mapping per-pixel coordinate information in a target image to virtual cells.

Preferably, the frame to analyze an image analyzes frames with the same interval based on time or a frame identifier.

In the step of setting the segmentation information as cells, the segmentation process synchronized with the frame image analysis process determines whether the pixel information image analysis information of the most significant cell is single or plural in segmenting cells and, if there exist plural analysis information in a cell, segments the cell into a multiple of two of sub cells.

In the method of analyzing pixels in a coordinate region corresponding to the cell, the current cell is segmented if there exists plural cell analysis information.

The cell image information analysis process in the analysis information storing step uses analysis information of color, texture and contour line determination. If plural analysis information is present in one selected cell in the analysis process, the cell is segmented into a multiple of two of sub cells, for example, four or eight sub cells, whose cells are analyzed in the same manner.

Preferably, the image analysis process is performed for cells segmented up to a specific segmentation depth until a single image analysis attribute is detected.

Preferably, the image analysis information is stored along with segmentation sub cells.

Preferably, in the object identification step, the mapping information of a cell segmented using image information of each segmented cell is used to select adjacent cells corresponding to the segmented cell sequentially, image information such as color and texture information of the selected cells is analyzed, and if the analysis information is single, it is determined that the cells are included in a single object.

Preferably, in the cell analysis process, if one or more analysis information is present as a result of analysis of color, texture and boundary information of the selected cell, and if a preset single object determination ratio, i.e., image analysis information of pixels included in a cell in the one or more analysis information, is within a margin of error of signal analysis information, the single object determination ratio is interpreted as the same single information and single analysis information is stored as representative image information of the cell.

Preferably, in the cell analysis process, if one or more analysis information is present as a result of analysis of color and texture information of the selected cell, the cell is segmented into a preset number of sub cells, image information of each of the sub cells is analyzed, and single analysis information for the sub cell is stored as image information of the sub cell.

Preferably, in the cell analysis process, if one or more analysis information is present as a result of image information analysis of the sub cell, the sub cell is again segmented into a preset number of lower level sub cells, image information of each of the lower level sub cells is analyzed, and single analysis information for the lower level sub cell is stored as image information of the sub cell.

Preferably, in the cell analysis process, the sub cell segmentation and image analysis is repeated up to the preset highest level sub cell.

Preferably, in the cell analysis process, if one or more analysis information is present as a result of image analysis of the highest level sub cell, one of the one or more analysis information is stored as image information of the cell.

Preferably, the simple object information storage process stores cell information including respective positions and image information represented by cell information constituting the objects.

In the object identification step, it is determined whether or not image analysis information of adjacent consecutive cells is the same in order to identify and extract objects using the image information of the analyzed cells. If so, cells having the same information are displayed as the same object.

In the analysis cell determination, a cell to be analyzed includes a plurality of pixels.

Preferably, in identifying an object from the image analysis information, an upper level cell includes a multiple of two of the lowest level cells. For the identical analysis information, upper cells are not divided into the lowest level cells and are handled as one group.

A set of a series of cells having same color, texture or consecutive contour divisional boundary, where adjacent lowest cells or upper cells in the analysis information in the object indexing step are cells having adjacent planes consecutive with cells having at least one plane.

In this case, in the object indexing step, objects are represented by cell information for relative positions included in the image and are managed and stored.

In the method of storing the object identification information, designated cells are constituted by same frames.

Preferably, in managing per-frame object identification information, this information is managed as binary summary information including information on whether or not object are included in a cell position in one frame.

The may be expressed by the following Table 1.

TABLE 1

| 0 | 0 | 0 | 0 | 0      | 0 | 0 | 0 |
|---|---|---|---|--------|---|---|---|
| 0 | 0 | 0 | 0 | 0      | 0 | 0 | 0 |
| 0 | 0 | 0 | 0 | 1 (5, 3) | 1 | 0 | 0 |
| 0 | 0 | 0 | 0 | 1      | 1 | 0 | 0 |
| 0 | 0 | 0 | 0 | 0      | 0 | 0 | 0 |
| 0 | 0 | 0 | 0 | 0      | 0 | 0 | 0 |

Table regions shown in [Table 1] indicate virtual cell regions corresponding to frame regions in an image. Cell regions divided by '0' and '1' in [Table 1] are represented to distinguish cell recognized as objects.

One virtual cell in [Table 1] corresponds to a region created by segmenting a frame into a multiple of two of sub frames in an image, which is a set of pixels corresponding to absolute pixel coordinates, showing segmentation of highest level virtual cells.

[Table 1] represents cell regions identified as objects. In this manner, the present invention represents and manages the identified objects as virtual cell regions.

When the cell is represented in hexadecimal, relative position information of an object included in one frame may be represented object identification information for the frame, '0x00000C0C0000'.

In storing and managing identification information of object positions in the virtual cells, the number and representation of the highest level virtual cells may be configured in various ways, including horizontal lines, vertical lines or a set of polygonal cells.

TABLE 2

| 0 | 0 | 0 | 1 |
|---|---|---|---|
| 0 | 0 | 1 | 1 |
| 0 | 1 | 1 | 1 |
| 1 | 1 | 1 | 1 |

[Table 2] shows object identification regions in sub cells segmented from one highest level cell shown in [Table 1].

As shown in [Table 1], 8×6 highest level cells may be each segmented into a plurality of sub cells. With the leftmost and top cell in [Table] as a reference cell, object identification and index information of a sub cell located at a cell coordinate (5,3) indicated by '1' may be represented by a virtual sub cell table as shown in [Table 2] which may be also represented in binary.

In addition, in the present invention, a connection angle between adjacent successive cells of the lowest level sub cells and a relative distance between vertexes at which angle variation occurs are calculated for object identification.

A polygon extracted for the object identification compares similarity of a polygon database with a sample database and calculates a general object attribute.

Preferably, image attribute information and object pattern information of an object represented in binary are managed as index object information of search and copyright of a similar frame.

Preferably, image information and object variation information analyzed in the unit of frame through the object identification process are used to segment a frame scene.

Preferably, a frame sampling for the frame scene segmentation and object identification is carried out using variation of pre-designated previous and next frame analysis information with a certain frame selection period other than for each frame.

Preferably, a rate of this sampling is 29.97 frames/sec for a typical image screen, which may be achieved by increasing a specified number of frame counts or through object and image analysis with a certain time interval.

The scene division step includes analyzing identification information of previous and next frames to determine whether or not variation information of the frame identification information is within an allowable range.

In more detail, preferably, variation of a background screen and addition or subtraction of the number of detected objects in an image analyzed in the scene segmentation are compared to segment the scene.

In the scene segmentation, a weight may be applied for either a background or object variation information.

In the scene segmentation, for the object identification, a center cell is selected form object cell set information, phase variation information for each frame of the center cell is checked, and a variety of variation information is analyzed within a certain period of time based on variation depending on the presence of objects in the cell.

In more detail, the same image information and object analysis information may present at a variety of cell coordinates and may appear repetitively within a frame. At this time, preferably, if an object within a start range of a reference frame is not present within an allowable frame range, the object is determined to have no relation to the scene and is segmented based on determination on whether or not variation if the number of times of appearance of objects is within a specified range.

The object profile generation step includes object attribute and feature set database to provide additional attribute information of stored objects.

In this case, the feature set may be represented by a format such as, for example, XML (eXtensible Markup Language).

Preferably, examples of object features include a representative object feature, a general attribute feature, a relationship feature, a component attribute feature and a special feature.

Preferably, the representative object feature applied to the identified object is representative of objects such as persons, buildings, mountains, vehicles and so on.

Preferably, the general attribute feature includes a general attribute for motion, naturally-generated things, artifacts, living things and so on.

Preferably, the component attribute feature includes an accessory attribute, a condition attribute, a behavior attribute, an event attribute, a time-season attribute, a place attribute and so on.

The special feature includes is used for a special-purpose feature used for only special-limited objects of a particular video and has a feature attribute for extension for an additional attribute feature in addition to the above features.

Preferably, the relationship attribute feature includes features such as a vertical relationship, an inclusion relationship, a parallel or association relationship, an ownership or post relationship and so on.

Preferably, the above object attribute features may be managed as a single or feature set pattern and a feature attribute value is represented by a binary value "1" if a corresponding feature attribute is present and by a binary value "0" if not present.

When the objects are managed with detected attribute features, a relationship between features in a frame constituted by objects and a background and a scene constituted by a set of frames and association of attribute features are analyzed to allow situation recognition and processing of a variety of supplementary services.

In this case, preferably, the objects include sub objects, which are an accessory relationship of objects, that is, a relationship between main objects and sub objects.

Preferably, a variety of relationship between an object and another object may be formed, including inclusion, procedure, parallel and dependency relations.

Preferably, the object and sub object attribute and feature information is represented and managed in the form of a database or XML.

For recognition of various situation and event generation through calculation of the object features, it is preferable to include a rule database including conditions and a processing algorithm for recognition of object situations and events.

The rule database for recognition of object situations and events calculates conditions based on the presence of features of a plurality of objects and recognizes situations and events based on a result of the calculation.

The service profile generation process calls object information detected in the indexing process and motion information or particular contexts associated with objects and a service profile includes motion information for each of conditions.

For the service, the service profile may include a frame identifier of a frame in an image including objects, time information of a frame interval, situation information in the corresponding scene, cell information including object position information, search information relating to objects, product purchase information, video play information, advertisement information relating to object and frame scene situations, and so on.

To this end, preferably, the method of the present invention includes a step of adding metadata including feature information; a step of generating a service profile required by a user through a procedure of generating situation recognition and service contexts by applying respective rules to objects using the metadata when the metadata are input in response to a request; a step of generating a hierarchical structure between objects using information such as a variety of attribute information and relationship in the feature information of the objects; a step of storing hierarchical information including logical objects generated by the hierarchical structure; and a step of generating connection of services required for object regions and information.

To process the above steps, an accessory operation required by object analysis and detection and service analysis from an image or a multimedia will be described with reference to the following Tables 3, 4, 5 and 6.

[Table 3] shows objects extracted from a frame of an image and accessory information.

TABLE 3

| Item | Media title | | | | | |
|---|---|---|---|---|---|---|
| | A | | Frame index | | B | |
| | Object 1 | Object 2 | Object 3 | Object 4 | Object 5 | Object 6 |
| Cell vector | C | D | E | F | G | H |
| Additional document/ caption | | I | | Language analysis index | | J |

The process of analyzing and processing videos using the table has been described above. Here, this table shows an example of such process. If one video is analyzed, analyzed initial data are loaded in the [Table 3] and the media title in the table means a title of the video.

The frame index means an identifier of an frame being currently analyzed in a video or an identifier which can represent a position of a current target frame, such as video performance time. Objects, such as object 1, object 2, etc., mean a set of cell coordinates of objects detected from one frame.

In this case, preferably, the cell coordinates represent region cells of objects by defining (X,Y) coordinates from a corresponding reference coordinate and representing each cell in binary, as shown in [Table 1] and [Table 2]. In this case, preferably, one frame is divided into detected objects and a background or an environmental object other than the detected objects.

Preferably, if the analysis video includes a supplementary description document or a caption (I) for a corresponding media, a separate language analysis process is performed by synchronizing the document or caption with a frame region or a document frame region.

Preferably, index information obtained through the language analysis process includes a language analysis index (J).

[Table 4] is an object feature analysis rule data table.

TABLE 4

| Item | Feature vector | | | Situation and event type |
| --- | --- | --- | --- | --- |
| | Feature pattern | Feature pattern | Feature pattern | |
| Rule 1 | | | | |
| Rule 2 | | | | |

[Table 4] shows a rule database for determining key objects and main objects by analyzing objects specifying the analysis information shown in [Table 3].

The rules are used to extract a desired result by analyzing object feature values and required information or association.

In more detail, situations or events of objects suitable for an object feature bit pattern are extracted from the database by determining whether the objects have a common feature or different features.

TABLE 5

| | Object 1 | Object 2 | Object 3 | Object 4 |
| --- | --- | --- | --- | --- |
| Representative object feature | | | | |
| General attribute feature | | | | |
| Component attribute feature | | | | |
| Relationship attribute feature | | | | |
| Shape/color attribute | | | | |

For the detected objects in [Table 3], linkage between the objects and context extraction of a frame are performed to analyze metadata including feature information for the frame and objects using the rules of [Table 4].

Preferably, the added and analyzed metadata in [Table 5] are in a feature table shown in the following [Table 6] for user service.

TABLE 6

| Item | Frame interval | Semantic feature | Object identifier |
| --- | --- | --- | --- |
| Index word 1 | | | |
| Index word 2 | | | |

Preferably, if a video or multimedia includes voice recognition, text information or caption information, [Table 6] provides a variety of intelligent service by mutually calculating semantic features and lexical features extracted from a scene or frame.

This is to associate an index word with a corresponding object by analyzing semantic features through morpheme analysis and division analysis for a plurality of index words extracted from a particular frame interval A and, and, if there exists an object matching to a frame situation or context, connecting the analyzed semantic feature to the object.

Preferably, an input method in the determination process is one of an object selection pointing and a method of inputting a natural language including voice and keywords.

Object selection information in the frame includes a frame identifier and a cell identifier.

In this case, a function or procedure is provided which maps pixel coordinates of a screen to relative coordinates of an object.

Preferably, the input information for search is preferentially used to search related services before and after a start point of frame when an input occurs using an input object selection pointing, voice or a keyword.

Preferably, the service provision process displays corresponding object information based on the service profile information generated in the service profile generation process.

To accomplish the above objects, preferably, an image processing apparatus of the present invention includes an image service server and a user terminal which are connected via one or more of a mobile communication network and a wired/wireless communication network.

Preferably, the image service server includes an image information storage unit which stores image information including the object information and cell information which is screen segmentation information of each image; an input unit which receives the image information; an encoding unit which encodes the input image information and stores the encoded image information in the image information storage unit; an indexing unit which detects object information from the stored image information and matches the detected object information to the image information in the image information storage unit; an object information managing unit which manages a hierarchical relationship between the object information and metadata of the object information; a searching unit which searches the image information storage unit based on request information; a user interface unit which provides an interfacing with a user; a communication interface unit which provides an interfacing with a communication network; and a control unit which controls operation of the image information storage unit, the input unit, the encoding unit, the indexing unit, the object information managing unit, the user interface unit and the communication interface unit.

Preferably, the image processing apparatus includes an image service server which stores image information including object information, and cell information which is screen segmentation information of each image, and provides corresponding image information and the cell information, which is the screen segmentation information of the image, in response to an image information request; and a user terminal which receives display image information and corresponding cell information from the image service server, segments a display screen into cells based on the cell information, and outputs the display image information on the display screen.

In more detail, preferably, the image service server includes an image information storage unit which stores image information including the object information, cell information which is screen segmentation information of each image, and feature attribute and service link information in an object; an input unit which receives the image information; a video conversion unit which encodes or converts the input image information into an appropriate format to be stored in the image information storage unit; an information indexing unit which detects object information from the stored image information and matches a frame of the image information of the image information storage unit to object region and connection information within the frame; an index information management unit which manages a hierarchical relationship between the object information and metadata of the object information; an object feature registration unit which manages, provides and processes features and attribute values of the object information; an object feature information management database; an index and service information management database; a service registration unit which connects a variety of services to an image and manages a mapping; a search provision unit which searches the image information storage unit based on a variety of request information; a service request interpretation unit which interprets and processes a service request from a user terminal; a result output unit which extracts and processes a search result to transmit the search result to the terminal; a network connection unit which provides an interfacing with a communication network; and a control unit which controls the image information storage unit, the input unit, the video conversion unit, the information indexing unit, the object index information management unit, the service registration unit, the search provision unit, the service request interpretation unit, the result output unit and the network connection unit.

Preferably, the information indexing unit detects relative positions of objects included in the image, analyzes image information of a corresponding object, and stores simple object information including positions and image information of the objects represented by cell information constituting the objects.

Preferably, the information indexing unit detects a basic screen size for the image, segments the screen into a plurality of virtual cells based on preset segmentation information, analyzes image information of each of the virtual cells, recognizes a set of adjacent cells of the cells having the same analysis information as one object, and stores simple object information of each of the objects.

Preferably, the image information storage unit stores object identification information, image identification information including the object, configuration cell information including identification information of each of segmentation cells constituting the object, information on an area, center point coordinate and phase shift, and simple object information including an image attribute.

Preferably, the image information storage unit includes object feature and attribute information and service connection information connected to the object.

Preferably, the index information management unit receives metadata for each of simple objects detected in the indexing unit, generates a service profile for each of the simple objects using the metadata, receives association information between the simple objects, generates a hierarchical structure between the simple objects, and stores hierarchical information including virtual logical objects generated by the hierarchical structure.

The hierarchical information of the virtual logical objects or sub objects is defined by object feature information.

Preferably, the metadata include screen pixel position mapping information for virtual cells of objects, object attribute and feature information, and feature attribute information required for extraction of linkage information between objects.

Preferably, the image information storage unit stores, in a database, simple object metadata information including object identification information, image identification information including the object, classification information of the object, link information of the object, object detailed information and motion information according to an event. Preferably, the motion information according to an event is motion information according to object selection, voice input or a keyword input and includes at least one of movement to a corresponding link position, related information search or product purchase determination, and subsequent operation process standby operation.

Preferably, the image information storage unit stores logical object information including logical object identification information, image identification information including the logical object, classification information of the logical object, identification information about simple objects included in the logical object, and motion information according to an event. Preferably, the logical object information further includes lower level logical object information identification information. Preferably, the motion information according to an event is motion information according to selection of the logical object and includes at least one of movement to a corresponding link, product operation, and list display of simple objects included in the logical object.

Preferably, the control unit displays corresponding object information based on the service profile information generated in the object information management unit or moves the object information to a screen linked to the corresponding object.

Preferably, the image information storage unit stores image identification information, identification information of a cell which is the unit of screen segmentation for the image, and cell segmentation information including start and end coordinates of a corresponding cell, along with corresponding image information.

Preferably, the image information storage unit stores image identification information, identification information of a cell which is the unit of screen segmentation for the image, highest level cell identification information of the cell, and cell analysis result information including image analysis information, along with corresponding image information.

Preferably, the image service server stores a control command set in the storage unit to provide control commands when a service is provided to the user terminal via a communication network, and transmits the control command set along with streaming information whenever a scene is started. In this case, the control commands are used to request a user for an additional input for search or at a user intention request, more particularly, to provide a variety of search options to an output screen. This aims to provide a variety of user input interfaces by integrating a user input means with an image information display region to be displayed on an image display screen.

To this end, the image service server manages an input control command set common to scenes and a control command set compatible with each frame region in a database in association with object and index information.

The user terminal receives object selection information included in an image being displayed on a screen and delivers the received object selection information to the image service server and the image service server provides a supplementary service according to the object selection based on the motion information preset for a corresponding object based on the object selection information.

Preferably, the user terminal includes an image display unit which includes a display screen segmented into cells and outputs the display image information; a search information input unit which allows a user to provide various input means including object selection, keyword input and voice input; an input information interpretation unit which determines input information to determine whether or not an additional user input is needed; an input information generation unit which provides an additional input interface sufficient to perform a search for an input inquiry or complement a user's inquiry intention; and a result output unit which outputs a result transmitted from the image service server.

In this case, for example if a user selects an object to generate input information, a means for additionally selecting search conditions on whether to search information about the selected object, search a related video or connect link information is provided.

The input information includes an image identifier; a frame identifier or time information; cell information of an object position; control command selection information, and so on.

Preferably, for the input information generation, the image service server checks a frame or scene identifier, distinguishes between control command information to be provided in common in a common scene and control command information to be provided in a particular frame, and transmits these information in synchronization with image information of the terminal.

Preferably, the control command information is managed in the form of a database or table in the image service server.

Preferably, synchronization information managed by the server is transmitted with a suitable time interval in consideration of scene or frame identifier information and a transmission condition of a network.

Preferably, in generating a variety of input information in the terminal, an object selection cell region is checked and assigned to a position having the best identification in association with cell position information on which the object selection information is located.

Preferably, mapping information of coordinate information of the display screen to the cell segmentation information is stored and includes vector mapping information to be controlled to be transmitted to the image service server by recognizing the object selection information based on input information of a user.

The image service server and the user terminal may be integrated.

Preferably, the image service server and the user terminal exchange data via a communication network.

Hereinafter, preferred embodiments of the invention will be described in detail with reference to the accompanying drawings. Throughout the accompanying drawings, the same elements are denoted by the same reference numerals. In the following detailed description of the invention, concrete description on related functions or constructions will be omitted if it is deemed that the functions and/or constructions may unnecessarily obscure the gist of the invention.

FIG. 1 is a block diagram showing an image service server and a user terminal according to an embodiment of the invention. This embodiment includes an image service server and a user terminal connected via a network to provide a variety of supplementary services.

As shown in FIG. 1, an image service server 100 includes a video converting unit 110 which searches for videos to be serviced, makes an index registration request for service and converts or encodes the searched videos into a format suitable for service on a network; and an information indexing unit 120 which detects a basic picture size of a video, maps the detected picture size to segmentation cell information, divides mapping pixel coordinate regions of a basic picture per cell, analyzes picture information of a frame corresponding to a cell region, detects a cell region of an object, and generates object identification information about the detected cell object region through polygon extraction.

In this example, if there exist captions or related information in an image to be analyzed, the information indexing unit 120 performs a language processing procedure for a frame through a language analysis procedure. Preferably, the language analysis procedure includes a semantic analysis procedure including morpheme analysis and syntax analysis. An index keyword is characterized in that it is connected to a video frame and object information and is managed along with feature information and semantic information including a cell thereof.

The image service center 100 includes also an indexing information managing unit 130 which inputs and confirms object feature information on and an identified object and performs a metadata input procedure including object index information and feature provision. It is preferable to use feature information in the metadata managed therethrough to process context information, object relationship information, behavior information and so on of a corresponding frame as described in the above procedure.

A service registration unit 140 generates metadata by operating and processing object information detected by using an analyzed image object and relative coordinate information, which is virtual cell information at which the image object is located, polygon information of the object, feature information of the corresponding object, etc., according to a rule. A result of extraction of contexts of an object, frame and scene is stored and managed in an image information storage unit 190.

At this point, in order for the metadata and feature information to be stored and managed in the image information storage unit 190, an object feature database, a process rule database and so on are beforehand established and processed as shown in [Table 3].

The service registration unit 140 can use the metadata generated through methods and procedures of the information indexing unit 120 and the index information managing unit 130 to provide services of various methods for objects, frames and contexts, and, for this purpose, is responsible for service registration. The metadata is stored in an index and service information management DB (192), and various operation rules, feature analysis, language analysis and so on for generating and managing the metadata are stored and processed in a feature information management DB 191.

In addition, in order to effectively manage input control information object cell mapping information required by a user terminal 200, rules used to process terminal information and interactive command information and control command codes used for display on the user terminal are registered in the service registration unit 140, and at the same time, a corresponding service is processed.

Upon receiving a service request form the user terminal 200, a service request interpreting unit 160 preferably interprets a requesting inquiry. Specifically and preferably, the service request interpreting unit 160 first analyzes a service request type and then makes detailed interpretation on a result of the analysis so that an appropriate search can be achieved.

The analysis of the inquiry request service type involves determining whether the request inquiry is an object selection, a query language input or a voice input and performing a procedure of query language and voice recognition.

The inquiry interpreted by the service request interpreting unit 160 is searched in the index and service information management database 192 through a search providing unit 150, is formatted to a terminal output format through a result output unit 170, and is serviced to the user terminal through one or more of mobile communication and wired/wireless network 300 connected to a network connector 180.

The user terminal 200 may includes an image display unit 210, a search information input unit 220, an input information interpreting unit 230, an input information generating unit 240, a vector mapping information table 270, a control command information database 280, a network connector 250 and a result output unit 260.

The image display unit 210 displays an image received from the image service server 100 connected via a network.

The search information input unit 220 may be provided with input methods including a keyboard for inputting coordinates, natural languages or keywords using an input device (for example, a mouse or other pointing device) in the user terminal 200 on which an image is displayed, a microphone for voice input, etc.

The input information interpreting unit 230 analyzes a variety of input devices and methods input by the search information input unit 220.

At this point, the input information interpreting unit 230 makes reference to the vector mapping information table 270 in order to extract identifiers of cells corresponding to pictures depending on a method input by a user and provide a variety of interfaces interlocked with frames and objects at the point of time of inquiry input.

The inquiry interpreted by the input information interpreting unit 230 is subjected to a process of inquiring information input to the image service server 100. In this case, the input information interpreting unit 230 determines whether or not additional user inquiry information is needed and requests a control command information table 280 to provide a variety of addition information for a user screen.

The input information generating unit 240 generates input inquiry information through the above-described processes in order for the user terminal 200 to send the generated information to the image service server 100. At this time, a format of the generated inquiry information may be as shown in the following [Table 7].

TABLE 7

| Protocol identifier | Session ID | Message type | Reserved | |
|---|---|---|---|---|
| Video ID | | Frame ID | Cell ID | Payload length |
| Payload | | | | |

The data format generated as shown in [Table 7] obeys a packet rule in a communication network and is hereinafter called a "packet." The data format includes a protocol identifier, a session ID, a message type, a reserved field, a video ID, a frame ID, a cell ID and a payload length field, which are common header portions of the packet. The payload field may include a user ID, a natural language inquiry text or voice inquiry data, an authentication code, etc.

The message type defines types of a variety of input messages regarding whether an input message is a cell pointing in an image, a control command process, an inquiry input or a voice input.

When a terminal inquiry packet is sent to the image service server 100 via the terminal network connector 250, a result of process by the image service server 100 is output through the result output unit 260 of the user terminal 200.

FIGS. 2 and 3 show a data table for image indexing. A main table for image indexing is a database table for generating and managing various data used to analyze and process image information. More specifically, the data table includes an image main table 10, a scene segmentation table 20, a frame table 30, an object table 40, a sub object table 50 and a reversed frame object set table 60.

The image main table 10 is a general table for a target video. Video_ID 11 is an identifier for identifying the target video in the image service server. Disp_Size 12 is a picture size of the video which means a screen size at the time of picture encoding. Run_Time 13 is play time of the video. Cell_No_Depth 14 is the number of times of repeated division of sub cells to divide the video. Video_Title 15 is a title (name) of the video. Idx_Term 16 means an interval with which frames are extracted from the video and are indexed, and may be processed according to a dynamic indexing method with a specific cycle, that is, a time interval or a frame interval. No_Scenes 17 is the number of segmented scenes in the video. No_Frames 18 is the total number of frames in the video. Cate_Class_Id 19 represents a category classification system of the video.

The scene segmentation table 20 is an information management table used to manage scene segmentation regions in an image. In this table, Scene_Id 21 is a scene division identifier and has a scene start frame Start Frame 22 and a scene end frame End Frame 23. The scene segmentation table 20 further includes scene segmentation time Scene Time 24, scene key object Key Object 25, an object set 71, a control command 71 and a scene context recognition identifier Scene Context Id 28.

At this time, the key object 25 and the object set 71 refer to objects in a frame interval with which scenes are divided, and are used to manage which objects constitute a specific scene.

The frame table 30 includes a frame identifier (Frame ID) 31, a frame index (Frame Index) 32, frame time (Frame Time) 33, a frame object set (Object Set) 71, a control command (Control Command) 72, a frame context identification code (Frame Context ID) 34 and Service anchor 73 for processing services.

The frame identifier 31 identifies a specific frame region in an image, the frame index 32 is an index for managing relative coordinates of objects in regions divided into cells in a frame and object presence/absence determination and object search for a corresponding point coordinate region cell for an object cell region corresponding to a pointing coordinate sent from the terminal.

In more detail, object index values within a frame for objects masked with cells 'a', 'b', 'c' and 'd' segmented as shown in [Table 1] are as follows when each object index value is represented by hexadecimal bits: {0xC000, 0x8000, 0x0010, 0x2310, 0x7390, 0x21B8, 0x0038, 0x0078, 0x007C}. In this manner, frames are indexed and managed.

The frame time 33 represents temporal position at which a corresponding index frame is located. The frame object set 71 is 4-cell set information indicated with '1' in [Table 1].

The control command 72 is provided to a user for additional search options by the terminal. The server may provide a variety of search options and functions for each image, scene, frame and object. The highest merit of integration of the control command into an image screen is to secure flexibility for a limited screen and a limited function of an image streaming player.

Although the provision of a variety of search options and functions to the terminal image player results in complicated function of the player and difficulty in application to all terminals, when a desired control command is overlaid with a cell of a screen region of the player and the control command is selected, this can support the function to send an overlaid cell region value to the server and interpret this to request a specific function.

The frame context ID 34 is a key to manage context identification information of a corresponding frame.

The service anchor 73 is a service reference key for process with reference to service information provided to object and frame regions of the corresponding frame.

The object table 40 includes an object identifier 41, an object description name 42, a frame identifier 31, an object index 43, an object pattern 44, a polygon extraction type 45, a control command 72, an object context 45, a feature set 75 and a service anchor 73.

The object identifier 41 is a unique identifier to be provided to each object extracted and identified from a frame.

The object description name 42 is an object name and the object index 43 represents indexing a polygon including a coordinate of an object sub cell, an image color attribute, etc.

The object pattern 44 represents an object detection sub cell pattern by binary bits for extraction.

The polygon extraction type 45 may be used to analyze morphemes of an extraction cell region per cell and extract a feature of an object based on a proportion between vertexes, sides and elements of an extracted polygon.

The object context 45 includes information on contexts within a frame of an object.

The feature set 75 is a set including a variety of attribute information of an object.

Preferably, the feature set 75 is treated as an aggregate of sets by expressing all of feature sets for sub objects included in one object.

The sub object table 50 lists sub objects of an object and includes an object identifier 41, a sub object identifier 51, a sub object cell coordinate region 52, a control command 72, a feature set 75 and a service anchor 73.

The sub object cell coordinate region 52 represents sub object position coordinate information in an object region.

The reversed frame object set table 60 is a reversed mapping table for the frame table and is used to manage and search information of an object located at a corresponding coordinate in a frame.

The reversed frame object set table 60 includes a frame identifier 31, a control command 72, a frame context 34, an object abstraction digest offset 61, an object detection number 62, an object identifier and its coordinate 63.

The object abstraction digest offset 61 may be used to abstract an entire objection configuration, background and image analysis information in a specific frame for the purpose of searching the same or similar information and managing copyright for corresponding frames and so on.

Figure 5:
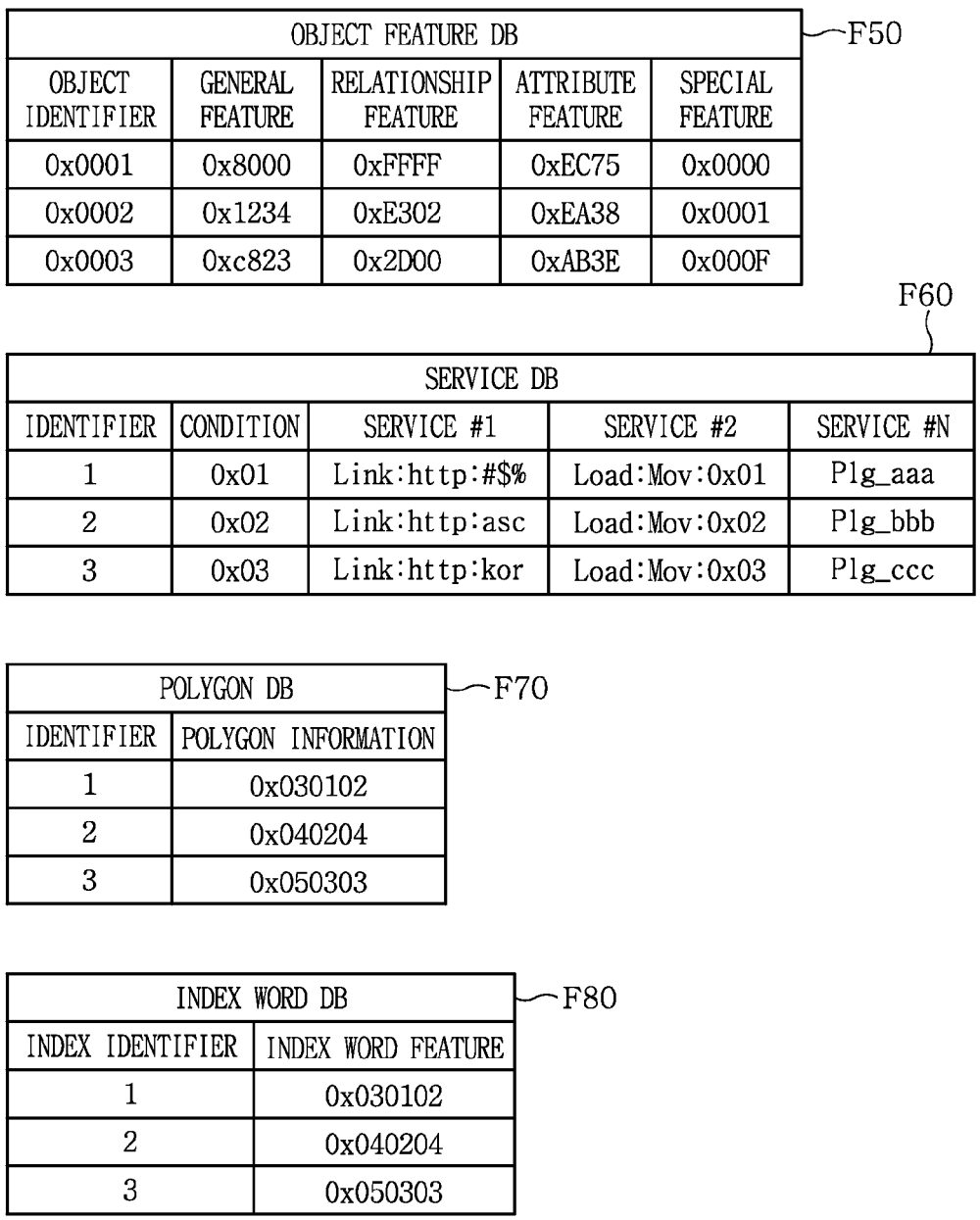

FIGS. 4 and 5 show tables used for management of service profiles and feature set information. The tables include a category table F10, a control command table F20, a context DB F30, an object index DB F40, a feature set DB F50, a service DB F60, a polygon DB F70 and an index word DB F80.

The category table F10 is a table for managing a corresponding service classification system required to provide a video-based service.

The control command table F20 is used to provide an interface to the terminal. This table provides a coordinate selected in a scene, frame or object or a function option to be offered by a corresponding frame to a screen. To this end, each control command has a unique identifier and control interfaces to be provided in a scene or frame may be differently defined.

For this purpose, the control command may have a statement to display the control command on a user screen and options including parameter values required to execute the control command.

The context DB F30 may include a context classification identifier; a feature matching rule for context extraction; a matching condition of being interpreted as a corresponding context; a key context; and a secondary context.

The object index DB F40 includes frame identification object information; condition information of a corresponding object; a service identifier connected to an object; an indexing word for an image caption or additional document information; and object connection information.

The object index feature DB F50 is an object index feature dictionary which manages a feature set based on an object feature classification system. A representative object feature dictionary includes an object identifier; a general feature; a relationship feature; an attribute feature and a special feature.

The feature DB feature attribute has a feature representation of 128 bits for one representative object, for example if 32 bits are assigned to each feature attribute. This is preferably managed by setting the object to '1' if there exists an object feature classification feature or otherwise setting the object to '0.'

Through this process, in order to search any context or its association, it is preferable to perform intelligent search and management for frames and objects in an image through comparison and operation for specific feature values of objects by means of a Boolean operation for two associated objects.

For the service DB F60 the service anchor value shown in FIG. 2 is preferably used as a service DB identifier, which corresponds to the concept that a parameter value which can be processed in a corresponding service call is used as a condition for the identifier and a service defined in the service DB is called as a result of interpretation for any input value in an object or frame through a corresponding control command.

The polygon DB F70 is a reference database which constructs values of a polygon having object identification result detection values as polygon information to extract the number of vertexes, a feature of adjacent angles and a feature of ratio of sides, and, if the polygon information reaches a predetermined value, estimates the polygon information as an approximate value of the corresponding object.

The index word DB F80 is a language analysis reference dictionary database which identifies contexts through morpheme analysis and syntax analysis and maps a corresponding context and event to an object in a frame for language analysis and event processing for documents and captions included in an image.

Figure 6:
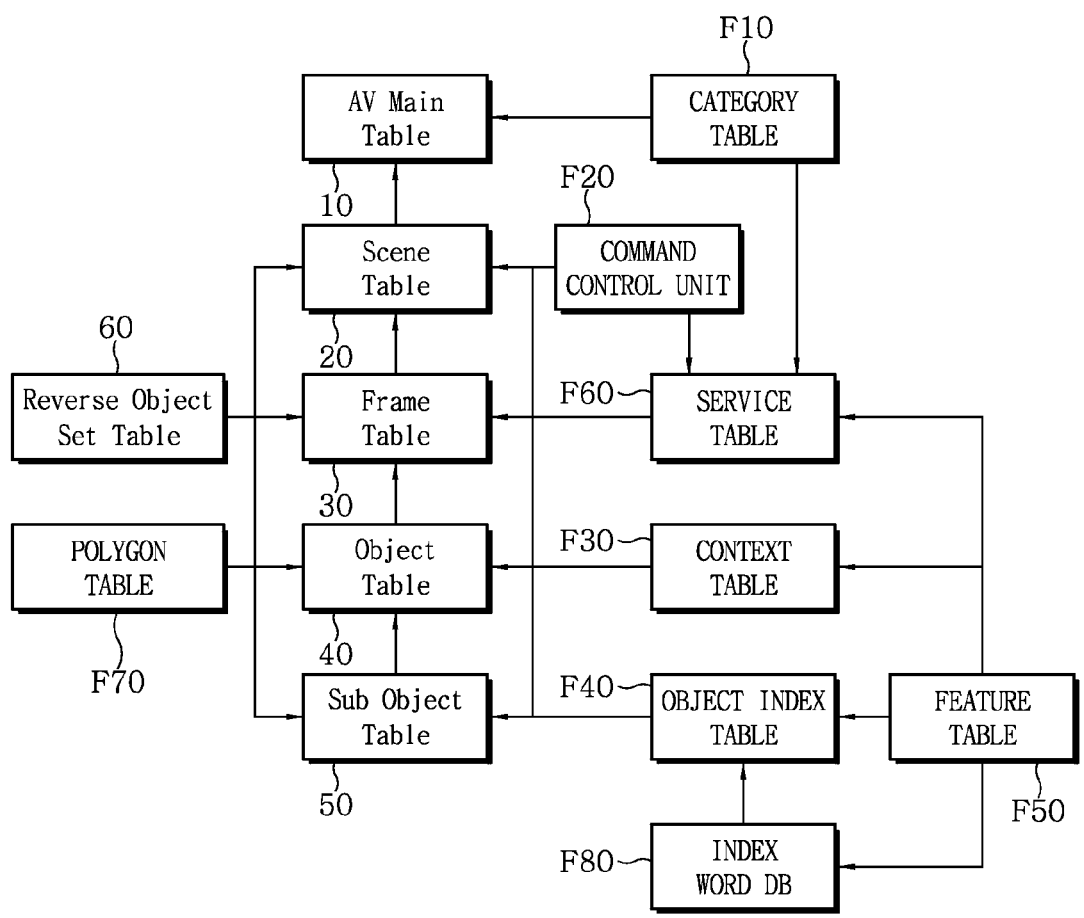
FIG. 6 is a view showing a relationship between image object data and service metadata according to an embodiment of the invention.

FIG. 6 is a view showing a relationship between the databases shown in FIGS. 2 to 5. One video or multimedia may have an image main table 10 for image information management and an image may have a scene table 20 including a plurality of scenes. In addition, the scene table is composed of a plurality of frame tables 30, each of which may have a plurality of object tables 40 including image attribute information and objects, each of which may have a plurality of sub object tables 50.

When pointing information for a cell region is selected from the frame table 30 by the terminal, a reversed frame object set table 60 checks and processes object information and frame object abstraction information for the frame pointing information.

In addition, preferably, the scene table 20, the frame table 30, the object table 40 and the sub object table 50 make reference to the polygon table F70 in order to analyze information and extract objects and sub objects.

The category table F10 makes reference to manage a category and classification system in the image main table 10 and the service table F60 for service provision.

The service table F60 defines services and has link information in the frame table 30, the object table 40 and the sub object table 50.

The control command table F20 is used to manage interface control command information to be provided to a user in a scene or frame, manages data and rules to generate and manage a corresponding user interface when an object or sub object is selected, a search is made in a frame or a control command is generated through a voice input, and provide a user interface to provide scenes, frames, objects, sub objects and service.

The context table F30 is used to recognize and manage contexts of a scene, frame, object and sub object and allows a variety of context recognition-based video services through calculation of context and object-related information and feature.

The object index table F40 is a key table used to manage identification information of cell coordinate information, service information and object feature set information for extracted objects in a frame, through which an object corresponding to a specific pointing coordinate in a frame is extracted and a related service is searched and provided.

The index word DB F80 is an index extraction DB which maps an extracted index DB to object index information through morpheme analysis and syntax analysis if there exists additional document information or caption information in video information, so that natural language or keyword search for related information is possible.

The feature table F50 includes a feature DB for object feature and language processing and syntax analysis, which includes attribute feature information required for object analysis and language analysis.

Figure 7:
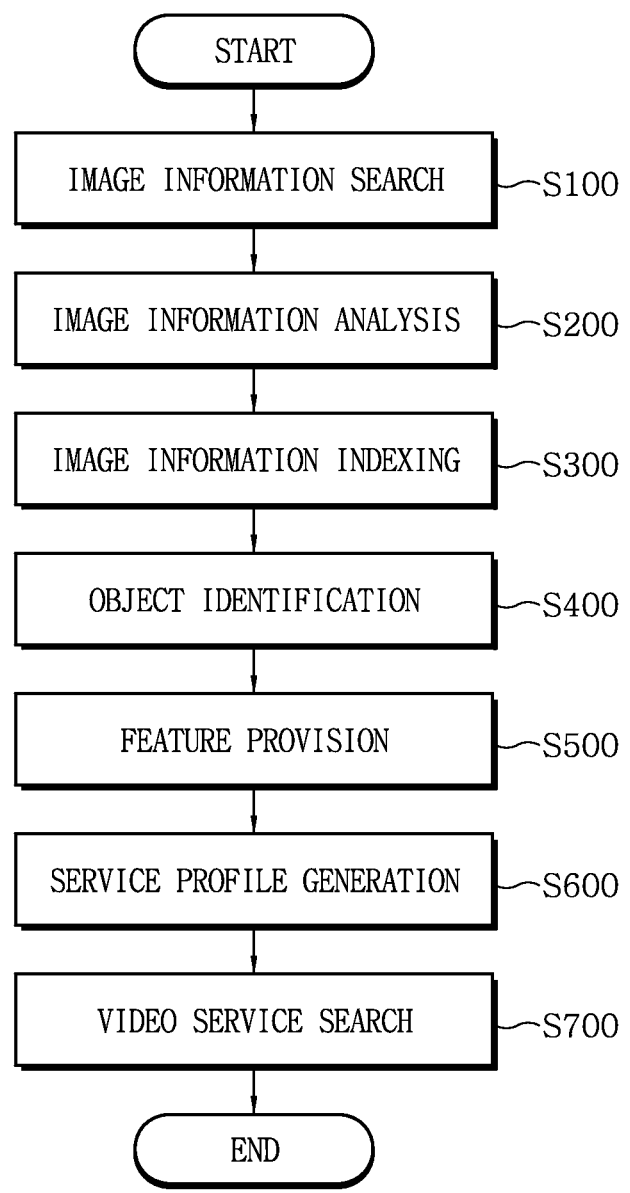
FIG. 7 is a flow chart of a process according to an embodiment of the invention.

FIG. 7 is a flow chart of a general process of the invention. The general process of the invention includes the steps of: image information search to check whether or not there is newly registered image information (S100); image information analysis to analyze a video format, screen information and so on for new target image information (S200); image information indexing to index extracted information to a cell region by analyzing image information from analyzed original image information (S300); object identification (S400); feature provision (S500); service profile generation (S600); and video service search (S700).

Figure 8:
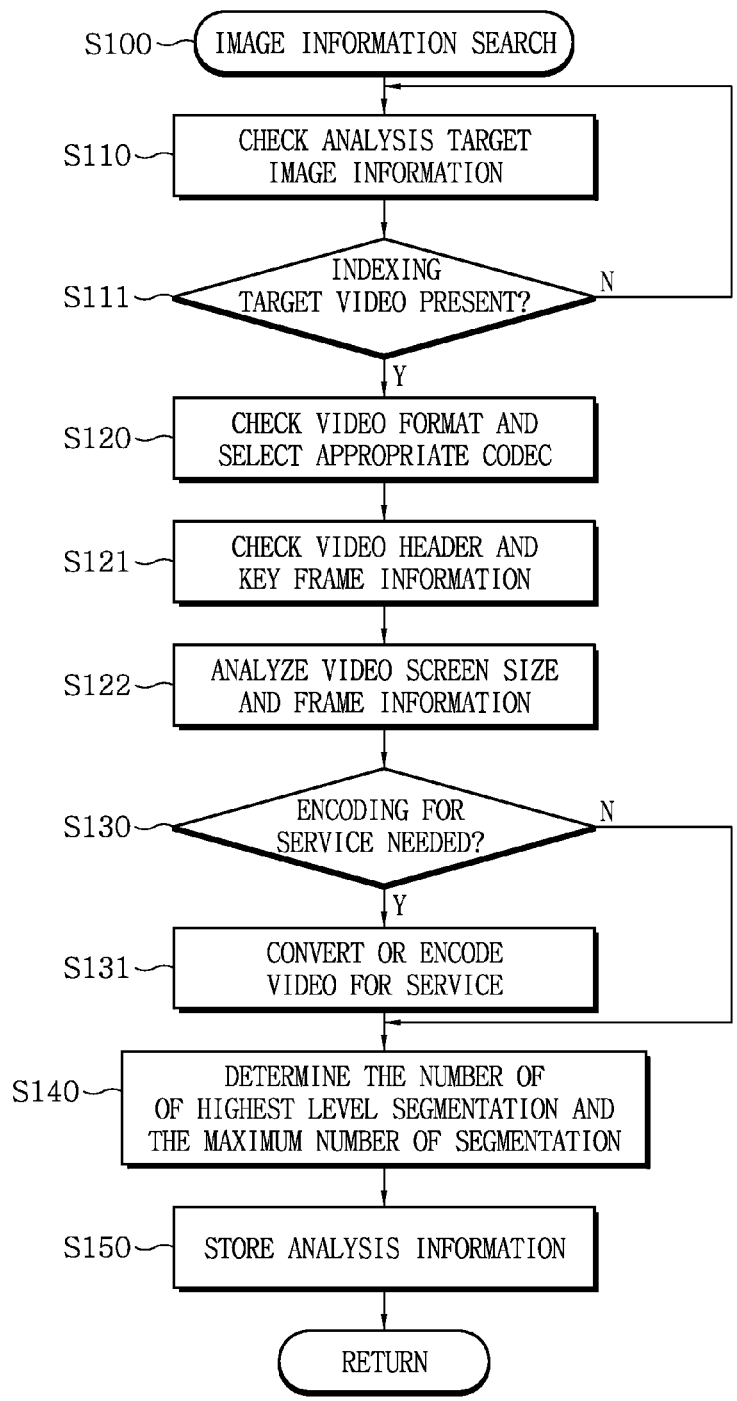
FIG. 8 is a flow chart of an image information search and process according to an embodiment of the invention.

FIG. 8 is a flow chart of image information search. First, it is checked whether or not there is image information to be analyzed in an image information repository (S110). Next, it is checked whether or not there exists a video to be indexed (S111). If so, video format and codec support is checked and an appropriate codec is selected to analyze the video (S120).

Next, video header and key frame information is checked (S121), a video screen size, frame information and so on are analyzed (S122), it is determined whether or not an original video is needed to be encoded with a code for service (S130), the video is converted or re-encoded for a streaming service (S131), and then the number of segmentation of the highest level cells and the maximum number of segmentation of cells are determined (S140).

The step (S140) of determining the number of segmentation of the highest level cells and the maximum number of segmentation of cells means a step of segmenting virtual segmentation cells for image analysis for screen size and pixel information analyzed from an original image, that is, a step of determining a segmentation depth. Here, the number of segmentation of the highest level cells means the number of segmentation of cells from a frame, and a cell is segmented by a multiple of two.

The segmentation depth in the cell segmentation means the number of times of repeated segmentation of the highest level segmentation cell by a multiple of two, and the maximum number of segmentation of cells means the total number of segmentation of the smallest cell generated by the repeated segmentation of the highest level segmentation cell.

The frame analysis cell information analyzed as above is stored (S150), and then the process is returned.

Figure 9:
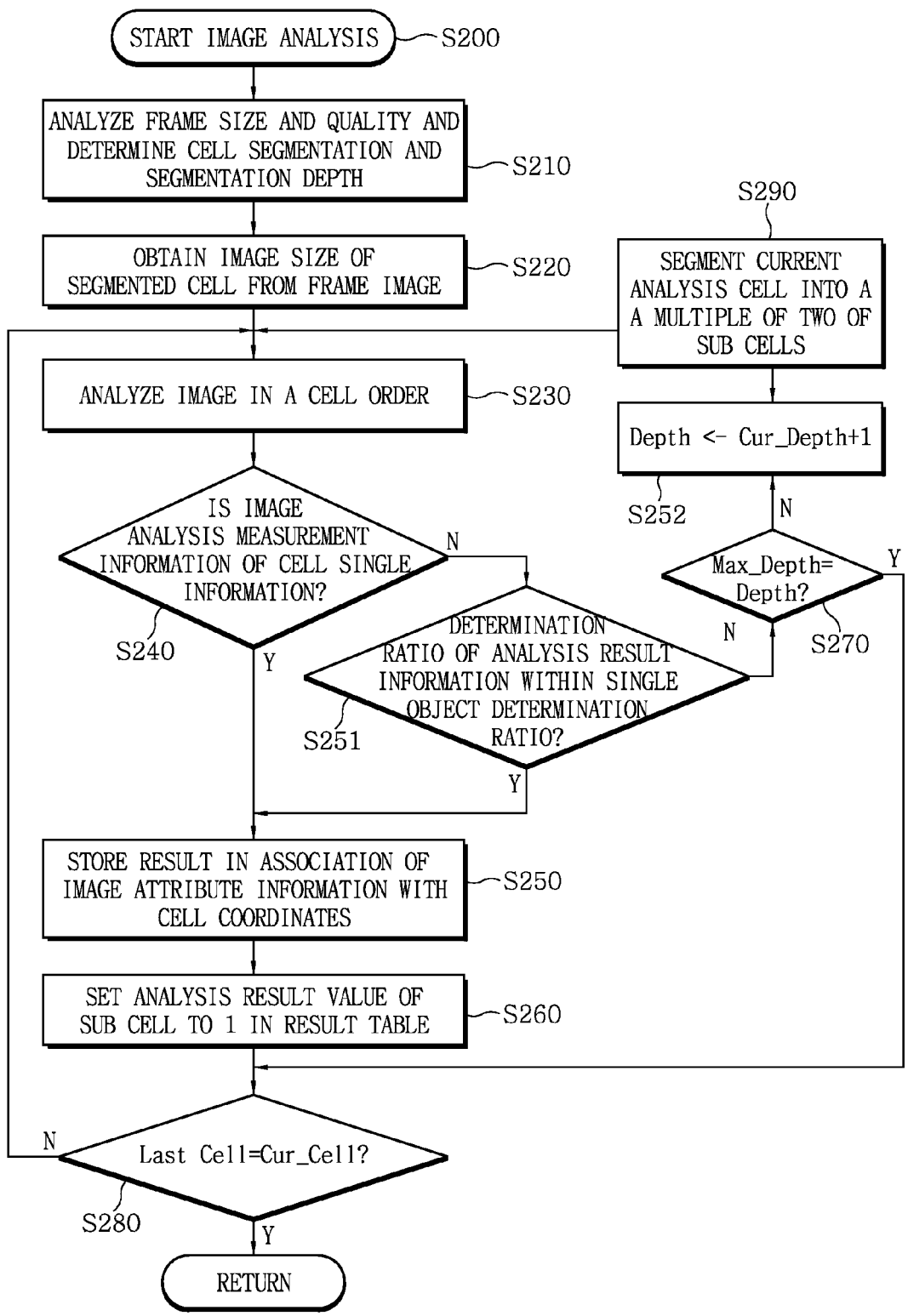
FIG. 9 is a flow chart of an image analysis process according to an embodiment of the invention.

FIG. 9 is a flow chart of an image analysis process. Size and quality of a frame are analyzed to determine cell segmentation and a segmentation depth (S210). An image size of a cell segmented from a frame image is obtained (S220). Images are analyzed in order from the segmented cell (S230). It is determined whether image analysis information of a cell has a single or plural analysis attributes (S240).

At this time, the image analysis information is image information within a pixel coordinate region of an image corresponding to a cell region. In addition, the information to be analyzed preferably includes color, texture, an image boundary line and so on.

If it is determined in Step S240 that the image analysis information has a single analysis attribute, the image attribute information corresponding to the cell is stored and a value of analysis result of a sub cell is set to '1' in a result table.

That is, size and quality of a frame are analyzed to determine cell segmentation and a segmentation depth (S210) in order to analyze a frame image, an image size of a cell segmented from the frame image is obtained (S220). Segmented images are analyzed in order (S230). It is analyzed whether or not image analysis information of a cell is single information (S240). If the image analysis information is within a single object determination ratio, a result of association of the image attribute information with a cell coordinate is stored (S250). A value of analysis result of a cell is set to '1' in a result table (S260). At this time, it is determined whether or not a current cell segmentation depth corresponds to the set maximum depth (S270). If so, it is determined whether or not there exists a next adjacent cell and the adjacent cell corresponds to the last cell (S280).

If it is determined in Step S240 that the cell image analysis information is the single information and it is determined in Step S251 that the analysis information is within the single object determination ratio, a value of cell analysis result is set to '1' in the result table (S260). Otherwise, it is determined whether or not a current cell depth corresponds to the maximum segmentation depth (S270). If not so, the current cell depth is incremented by one (S252), the current analysis cell is segmented by a multiple of two (S290), and the image is analyzed in cell order (S230).

In the above process, if the analysis information is out of the object determination ratio and the current cell segmentation depth is the maximum segmentation depth, it is determined whether or not the current analysis cell is the last cell (S280). If so, the analysis process is ended. Otherwise, a next cell is selected to analyze an image (S230).

Figure 10:
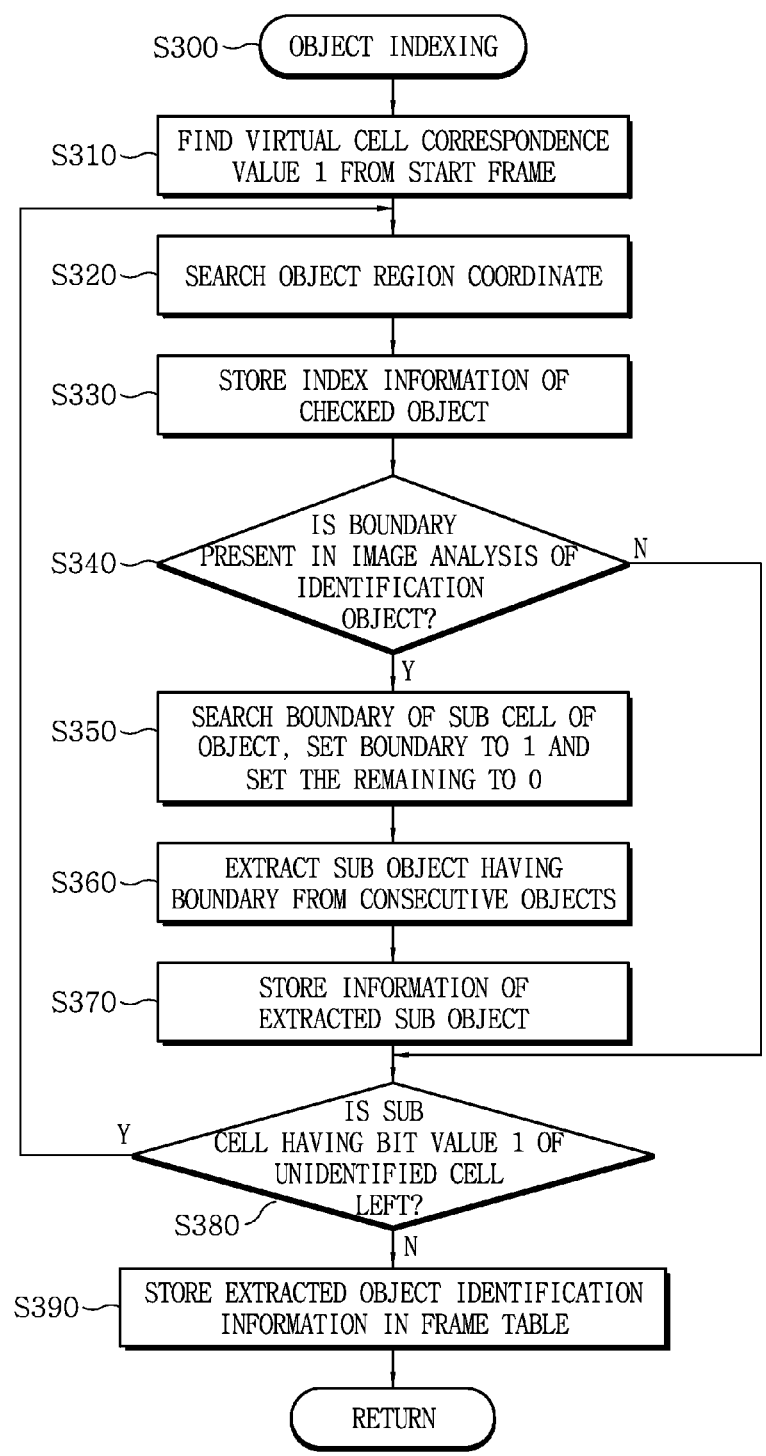
FIG. 10 is a flow chart of an object identification result storage process according to an embodiment of the invention.

FIG. 10 is a flow chart of an object identification result storage process. Object indexing (S300) includes a step of searching cells having a cell identification region value of '1' in a virtual cell correspondence region in a frame (S310), a step of searching an object region (S320), and a step of storing index information of a searched object (S330).

It is determined whether or not there exists a boundary in object image region analysis information of an object of the stored search cell region is analyzed (S340). If so, a sub cell boundary of the object is searched, a boundary is set to '1' and the remaining portions are set to '0' (S350).

A sub object having a boundary in continuous cells of the searched sub object is extracted (S360) and information on the extracted sub object is stored.

The above-described process is repeated until there remains no sub cell having an unidentified cell region value of '1' (S380), the extracted object identification information is stored in the frame table 30, and then the process is ended.

Figure 11:
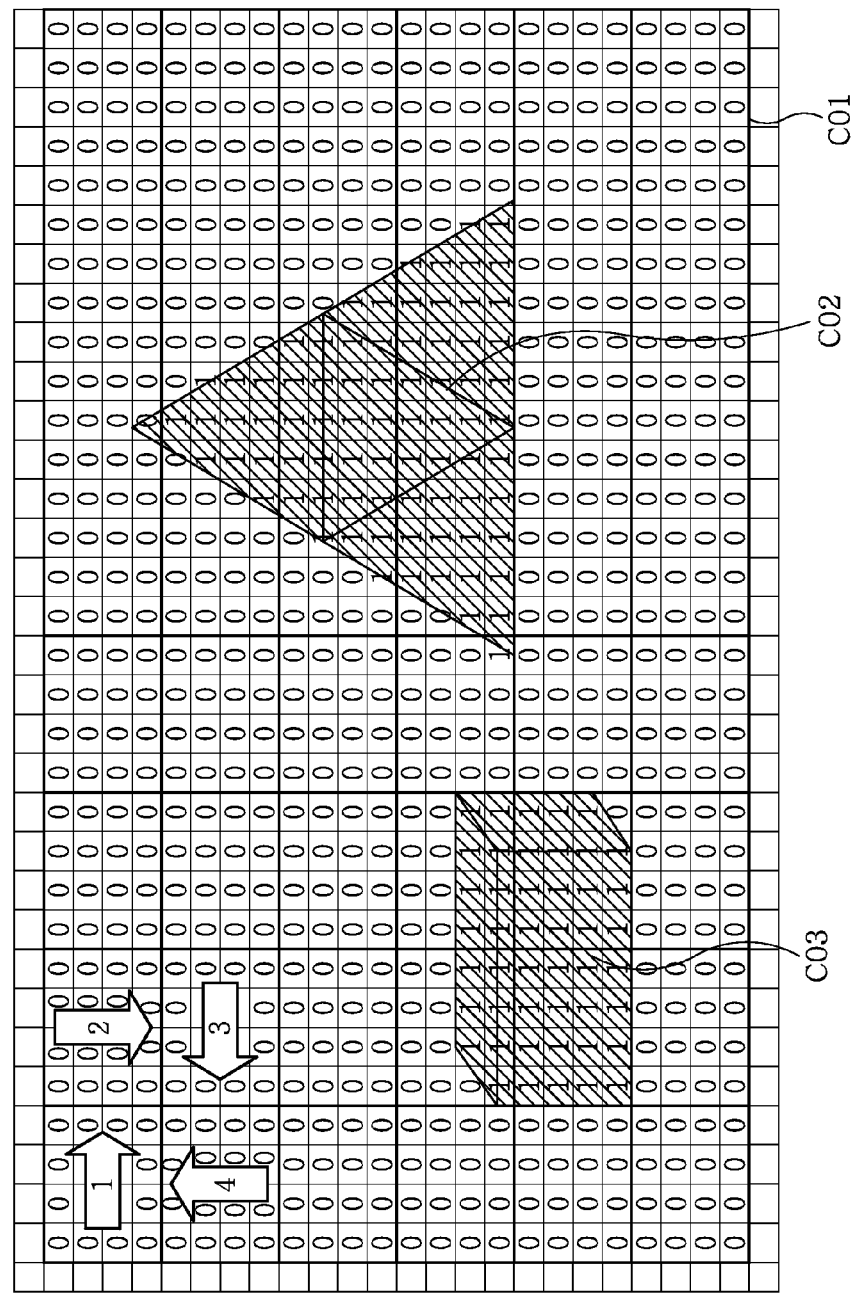
FIG. 11 is a view showing an example of object analysis according to an embodiment of the invention.

FIG. 11 is a view showing an example of object analysis. The entire segmentation cell region for the cell identification is a region corresponding to an actual pixel coordinate of a frame region of an image. Image analysis information in each cell region is determined to identify an object through a step of detecting color, texture and boundary. An identification value of the detected object region cell is set to '1' and each cell is the maximum segmentation cell region. A cell segmentation virtual description region correspondence cell C01 in a frame includes a triangular object C02 composed of four sub objects and a cubic object CC03.

The entire cell region corresponding to the frame region is set to '0' and an index identification cell or target cell region is set to '1'. Setting the sum of cells in left and upper regions indicated by arrows '1', '2', '3' and '4' to the maximum segmentation cell regions, each region indicated by each arrow is a region of a first segmentation depth and each '1' has four segments by segmentation by a multiple of two. That is, 12 highest level cells are shown in the figure through such a segmentation process, and each cell has 64 sub cells.

Accordingly, in a cell coordinate description method shown in FIG. 12, assuming that an x axis length of a screen is 'X', the number of x axis segments is 'n', a y axis length of the screen is 'Y' and the number of y axis segments is 'm', cell identification information of the virtual cell is preferably expressed as the following [Equation 1].

$$C_{ij} = \left\{ \left((i-1)\frac{X}{n}, (j-1)\frac{Y}{m}\right), \left(i\frac{X}{n}, j\frac{Y}{m}\right) \right\} \quad \text{[Equation 1]}$$

As shown in Equation 1, after the cell identification information is set, an analysis process for all of the segmented virtual cells is performed while varying values j and I as shown in FIG. 11.

$$O_{ij} = C_{ij}n(x,y)^m I \quad \text{[Equation 2]}$$

Where, $O_{ij}$: an object identifier and corresponds to a cell analysis index value of an object located at a coordinate (i,j) of a cell including the object.

$n(x,y)^m$: definition of a cell segmentation method and depth in an identification region including a target object at a cell coordinate C (i,j).

X: x coordinate cell length in the highest level reference cell

Y: y coordinate cell length in the highest level reference cell n: the number of sub cell segments in a upper level cell m: sub cell segmentation depth I: bit index value of a cell FIG. 12 is a view showing an example of screen segmentation for an image process according to an embodiment of the invention. Now, object analysis index information in $O_{ij}$ will be described through the detailed process shown in FIG. 11.

FIG. 13 is a view showing an example of sub cell segmentation information process. In the figure, $O_{ij}$ is coordinates of objects located in four regions '1', '2', '3' and '4'. Here, a cell coordinate 'C' means the highest level cell located at (i,j) from a frame region reference cell shown in FIG. 11.

In this case, the object is present in $C_{ij}n(x,y)^n$, a distribution of objects in a sub cell includes regions, and 256 cells represent sub cells.

$$I = \begin{Bmatrix} n_{x_0 y_0} & n_{x_i y_0} & n_{x_m y_0} \\ n_{x_0 y_j} & n_{x_i y_j} & n_{x_m y_j} \\ n_{x_0 y_n} & n_{x_i y_n} & n_{x_m y_n} \end{Bmatrix} \quad \text{[Equation 3]}$$

Object segmentation index information 'T' may be expressed as the above equation 3.

The $O_{xy}$ object index information of FIG. 13 may be expressed as the following equation 4, explaining a detailed object indexing method.

$$I = \begin{Bmatrix} 0x0000 & 0x0000 & 0x0000 & 0x0000 \\ 0x0000 & 0x0001 & 0x72FB & 0x0000 \\ 0x0000 & 0x071F & 0xFFFF & 0x20A0 \\ 0x0001 & 0x5FFF & 0xFFFF & 0xF0FA \end{Bmatrix} \quad \text{[Equation 4]}$$

In FIG. 13, the highest level cell '2' is segmented into sub cells 'A', 'B', 'C' and 'D' by a multiple of two, each of which is segmented into four parts.

At this time, when a cell of analysis information is extracted based on consecutive adjacent same-analysis similar-information through image analysis for objects and other background information in four-segmented regions in a sub cell 'C' (C04) of the cell '2', the sub cell C04 can be obtained.

This corresponds to a segmentation depth d (='3') in the above equation 4 ('I'). Expressing this as matrix index values in the unit of sub cell gives equation 4. At this time, identification values of the sub cell C04 are expressed as {0,1,1,1}, {0,0,1,0}, {1,1,1,1} and {1,0,1,1}. A hexadecimal expression f these bit values of each sub cell having d='3' is '0x72FB' and adjacent cells can be also expressed in the form of the equation 4.

Figure 14:
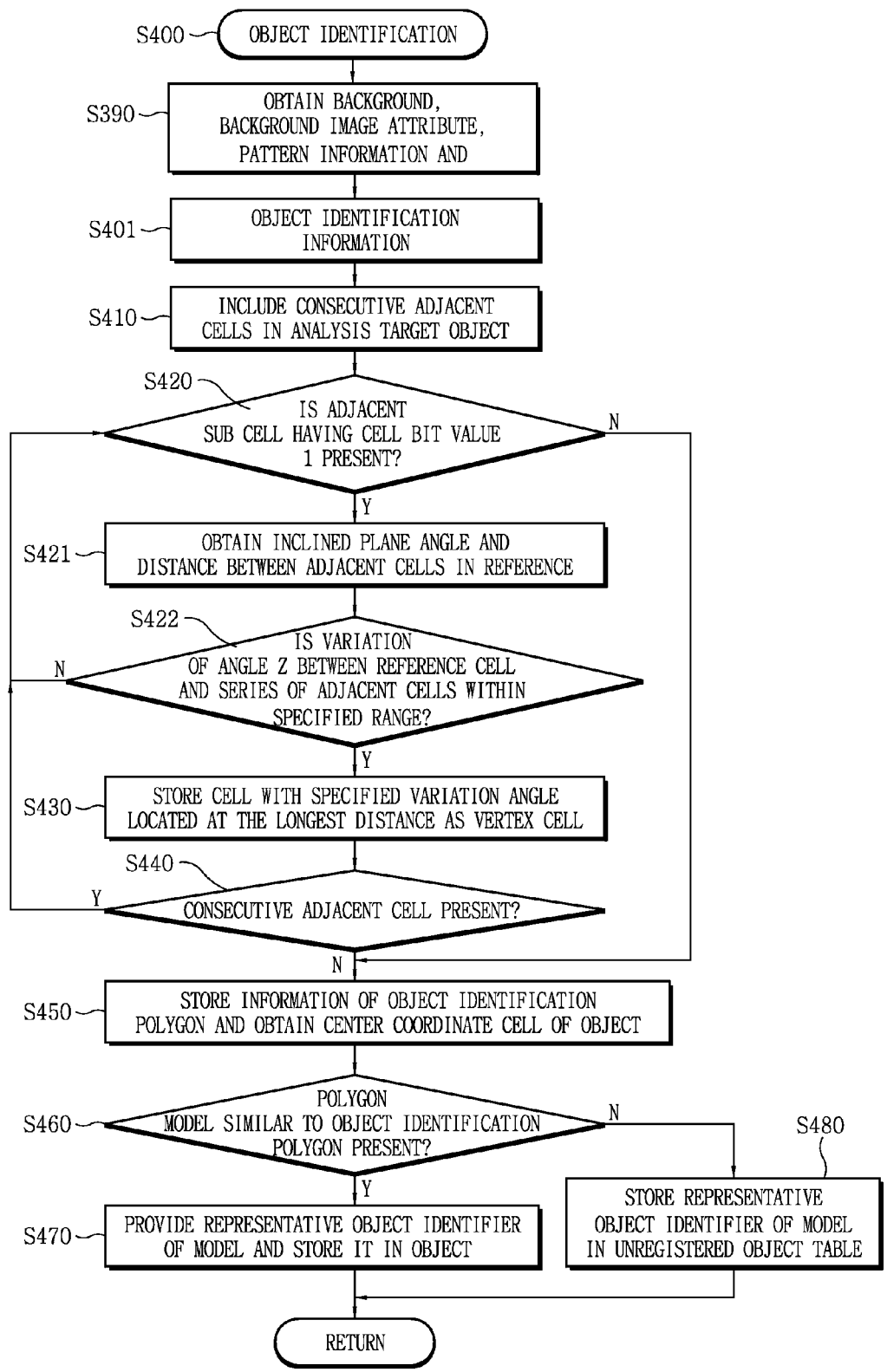
FIG. 14 is a flow chart of object identification and polygon recognition according to an embodiment of the invention.

FIG. 14 is a flow chart of object identification and polygon recognition process. Identification information and image attribute information of a background and objects are read from the stored extraction object identification information shown in FIG. 10 (S390), and a reference coordinate of an object segmentation cell $C_{ij}n$ including objects is obtained (S401). Consecutive adjacent cells are analyzed at the reference coordinate (S410), sub cells having a bit value '1' of an analysis cell is determined (S420), and an inclined plane angle and a distance between adjacent sub cells having the same attribute are obtained using a trigonometric function (S421). Variation of an angle (Z) formed between the reference cell and an adjacent cell in Step S421 is determined (S422), and a reference value is analysis and cell coordinates of vertexes are stored (S430).

The reference value of the variation angle means that, if a cell variation angle providing the longest distance between two or more adjacent cells is equal to or more than a predetermined angle (e.g., 150 degrees), this is regarded as a straight line and neighboring planes of each cell within 150 degrees are indexed with vertexes.

After the analysis between adjacent cells is ended, a result of the analysis is stored and consecutive adjacent cells are searched (S440). If there is no further cell to be analyzed, an object identification polygon is stored and a center coordinate cell of the object is obtained (S450). It is determined whether or not a detected polygon is similar to those in the polygon DB F70 (S460). If a similar polygon model is searched, this model is granted with a representative object identifier and is stored in the object table 40 (S470). Otherwise, this model is stored in an unregistered object table (S480).

Figure 15:
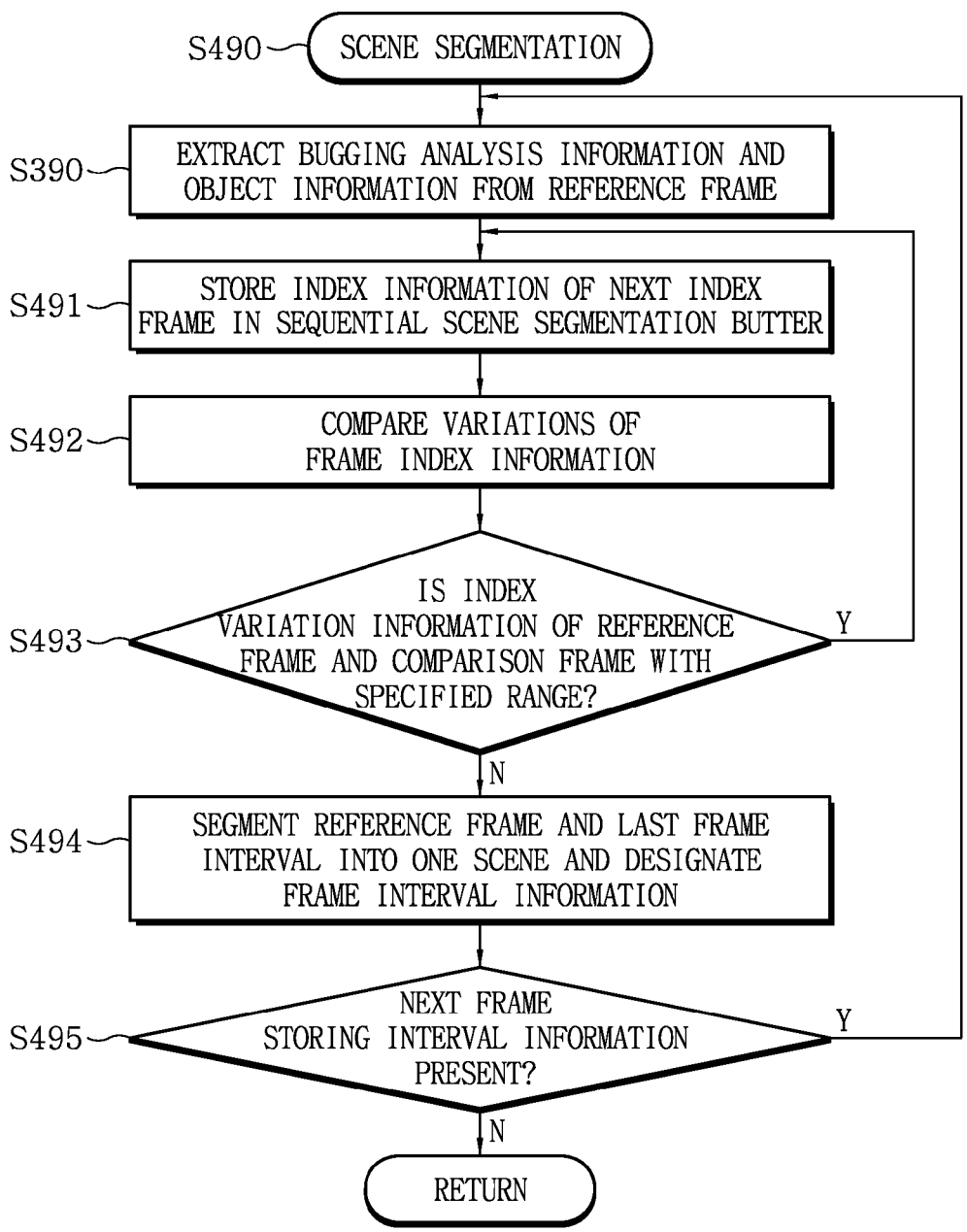
FIG. 15 is a flow chart of scene segmentation process according to an embodiment of the invention.

FIG. 15 is a flow chart of scene segmentation process. Initially segmented objects and background analysis information are extracted from stored frame information (S390), and adjacent index analysis frame information is stored in a scene segmentation buffer (S491).

The frame index information stored in the scene segmentation buffer is compared (S492) and variation information and similarity between the reference frame and the analysis information are determined (S493). If there is a similarity, the next frame is read and analyzed. Otherwise, a scene is regard to be converted and is directly segmented up to a frame, segmentation information is stored as scene interval information in the scene segmentation table 20 (S494), and this process is repeated until all image frames are analyzed (S495).

Figure 16:
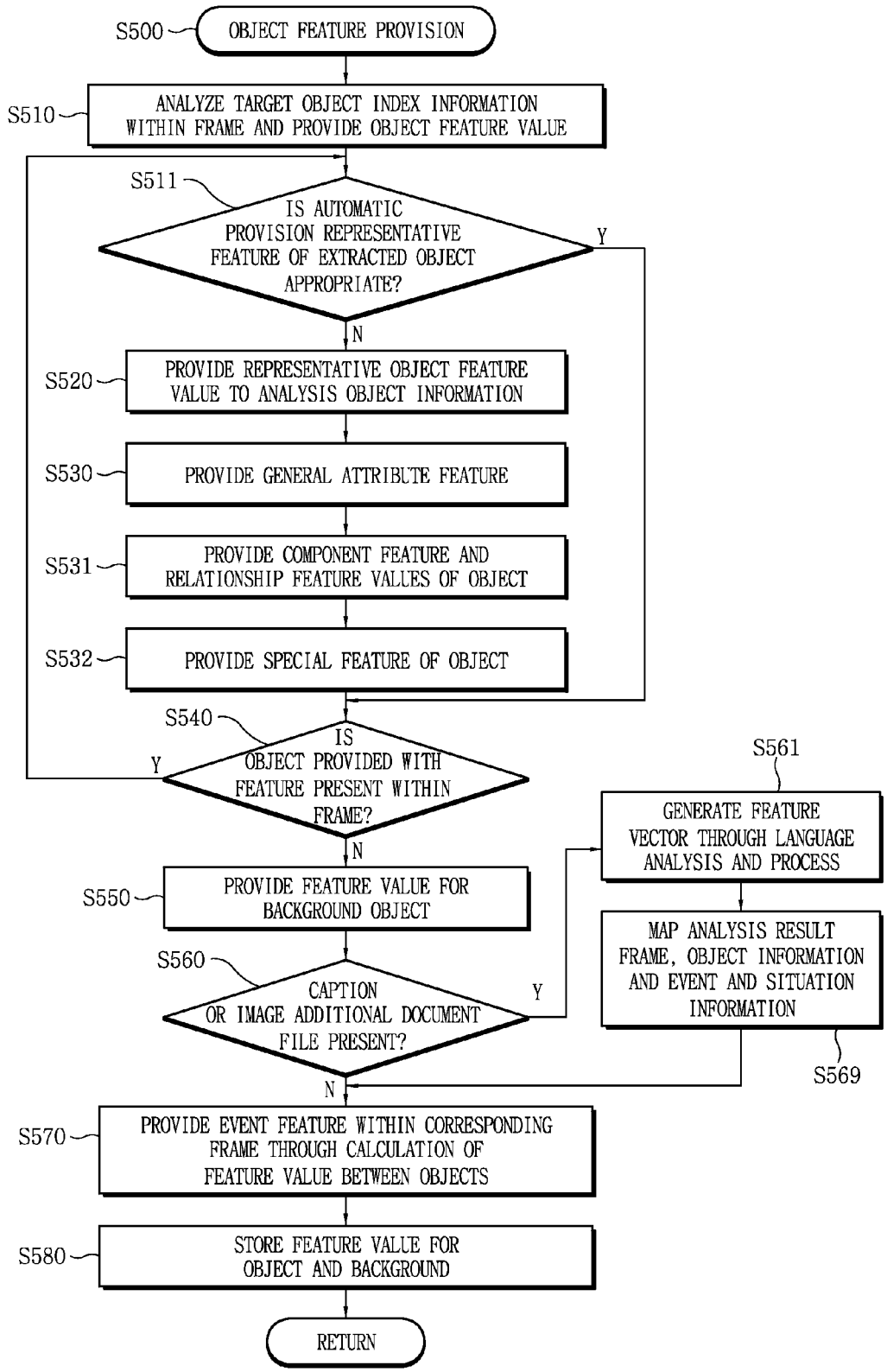
FIG. 16 is a flow chart of object feature provision according to an embodiment of the invention.

FIG. 16 is a flow chart of object feature provision (S500). An object feature value is provided using the objects and polygon information identified in FIG. 14 (S510), it is determined whether the provided feature value is proper or an unregistered object (S511). If this value is an unregistered object or improper, the analysis object information is granted with a representative object feature value (S520), a general attribute feature is granted (S530), component and relationship features are granted (S531), and a special feature is granted (S532) by checking whether or not there is a need of a special feature for a corresponding object.

After the extracted feature value in the frame is granted, objects in the same frame are searched to determine whether or not there are additional feature grant objects (S540). If feature values for all detected objects are granted, a feature value for a background object is granted (S550).

It is determined whether or not there exists a caption or image-related additional description document (S560). If there exist an additional document file, a text is extracted from the document file and a feature vector is generated through a language analysis and processing procedure with reference to the index word DB (S561). The feature vector and frame object feature information is analyzed to map event and context information (S569).

Event and context information in a corresponding frame is generated through feature calculation between objects (S570) and an analyzed result is stored (S580).

Figure 17:
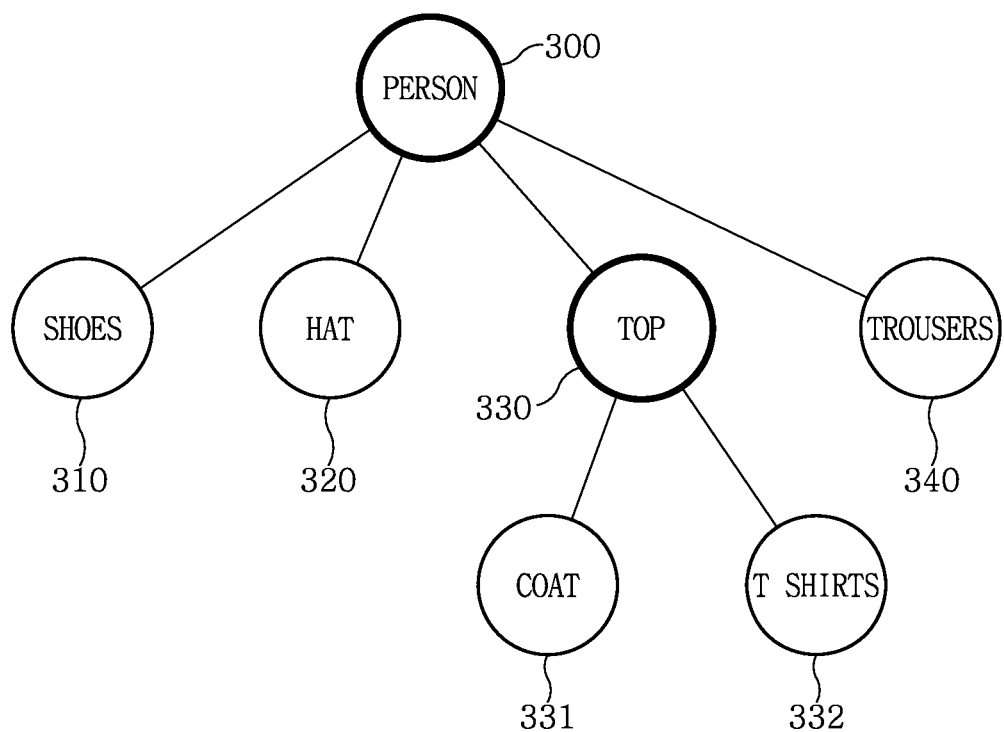
FIG. 17 is a view showing object logical association according to an embodiment of the invention.

FIG. 17 is a view showing logical association between detected object information according to an embodiment of the invention. Thick circular lines represent logical objects and thin circular lines represent simple objects.

Figure 18:
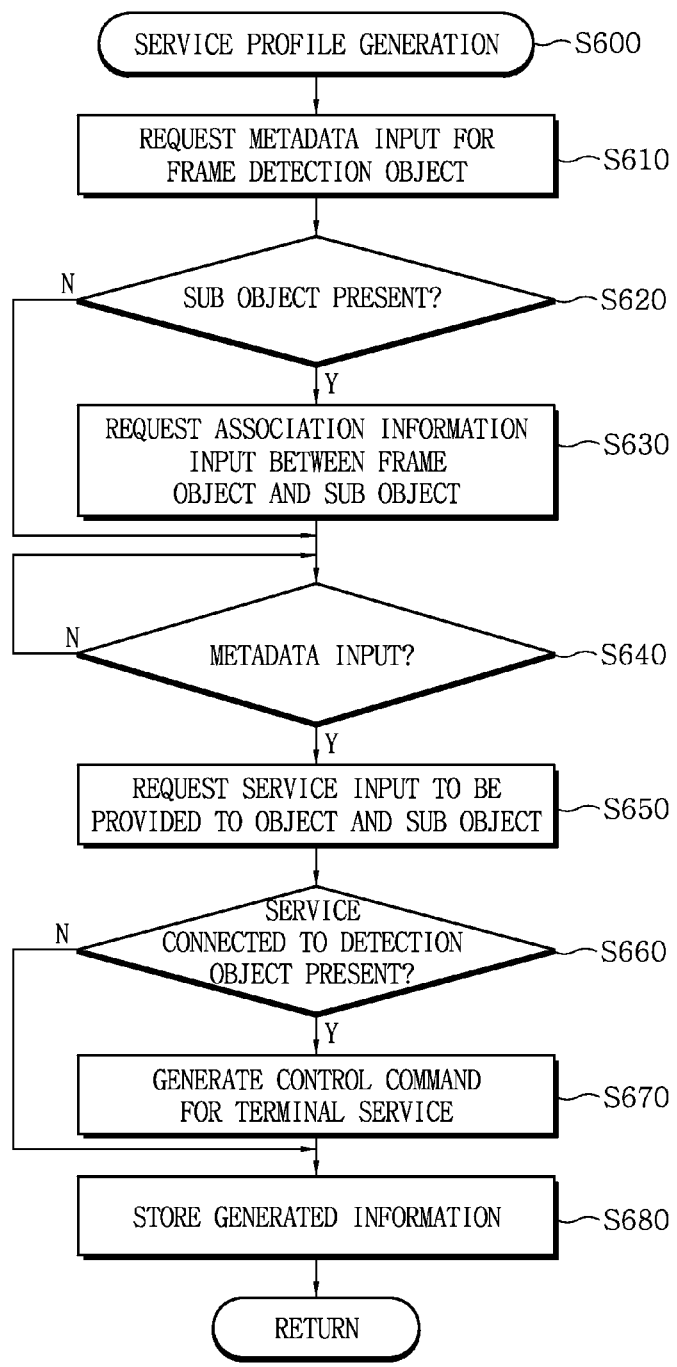
FIG. 18 is a flow chart of service profile generation according to an embodiment of the invention.

FIG. 18 is a flow chart of service profile generation process (S600). The service profile generation process (S600) includes a step of generating association information between objects, including logical association and relationship between objects as shown in FIG. 17 (S630), a step of generating a variety of service information about objects and sub objects (S650), a step of generating a control command for service provision (S670), and a step of storing the generated service profile (S680).

Figure 19:
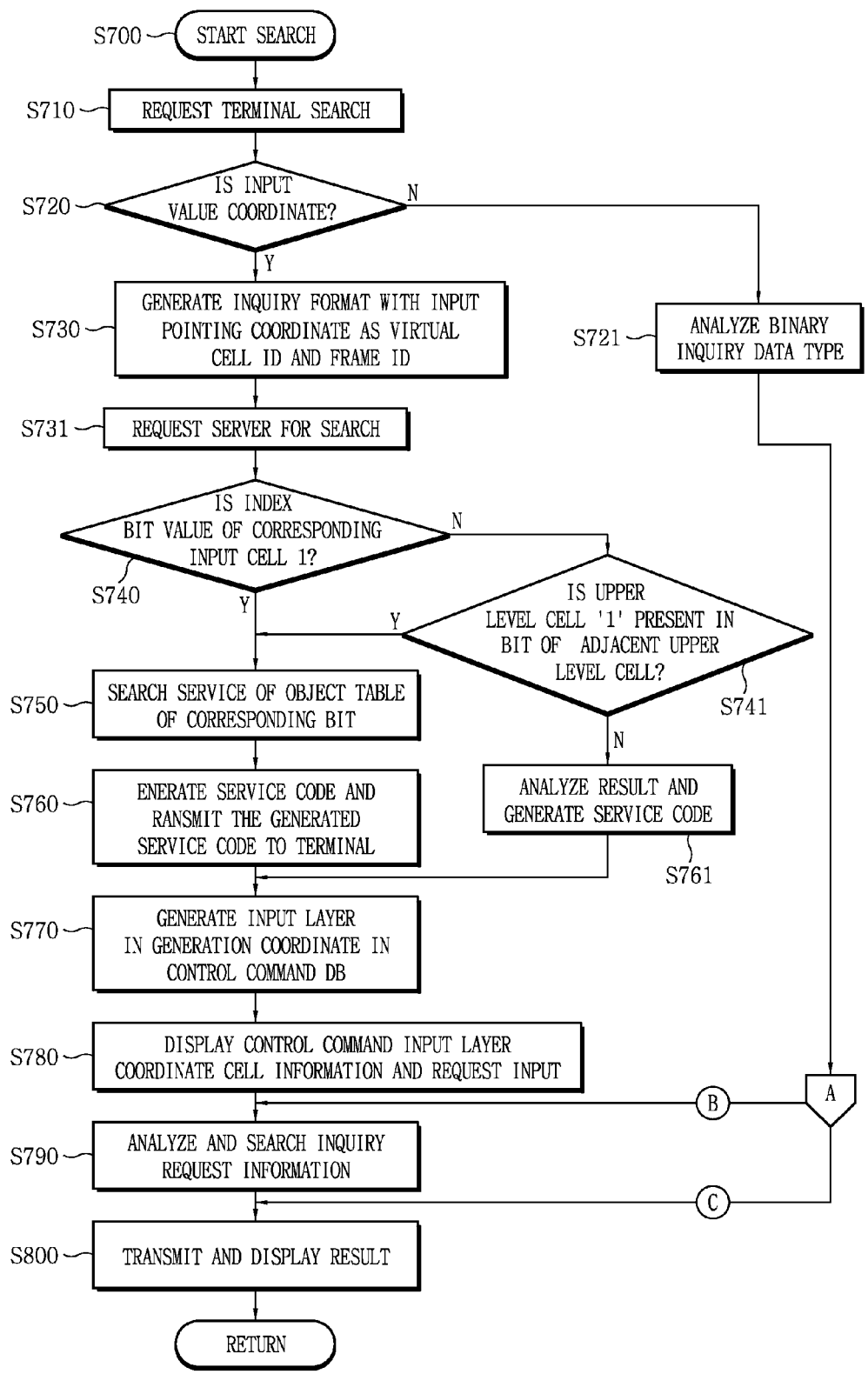
FIG. 19 is a flow chart of service search process according to an embodiment of the invention.

FIG. 19 is a flow chart of service search process. This service search process includes a step of determining an input value for image-based terminal search (S720 and S721), a step of generating an input inquiry data format [Table 6] and interpreting the inquiry data format (S740 and S751), a step of generating a control command code in the terminal (S760 and S770) to detect additional user's intention and search option in the inquiry interpretation step, a step of receiving an additional input from a user (S780), a step of performing an inquiry search therethrough (S790 and S791), and a step of transmitting and displaying a result (S800).

The input value may include a cell ID by a coordinate (S720) and a binary input (S721). The type of binary inquiry data may include a text, voice, image or video.

Figure 20:
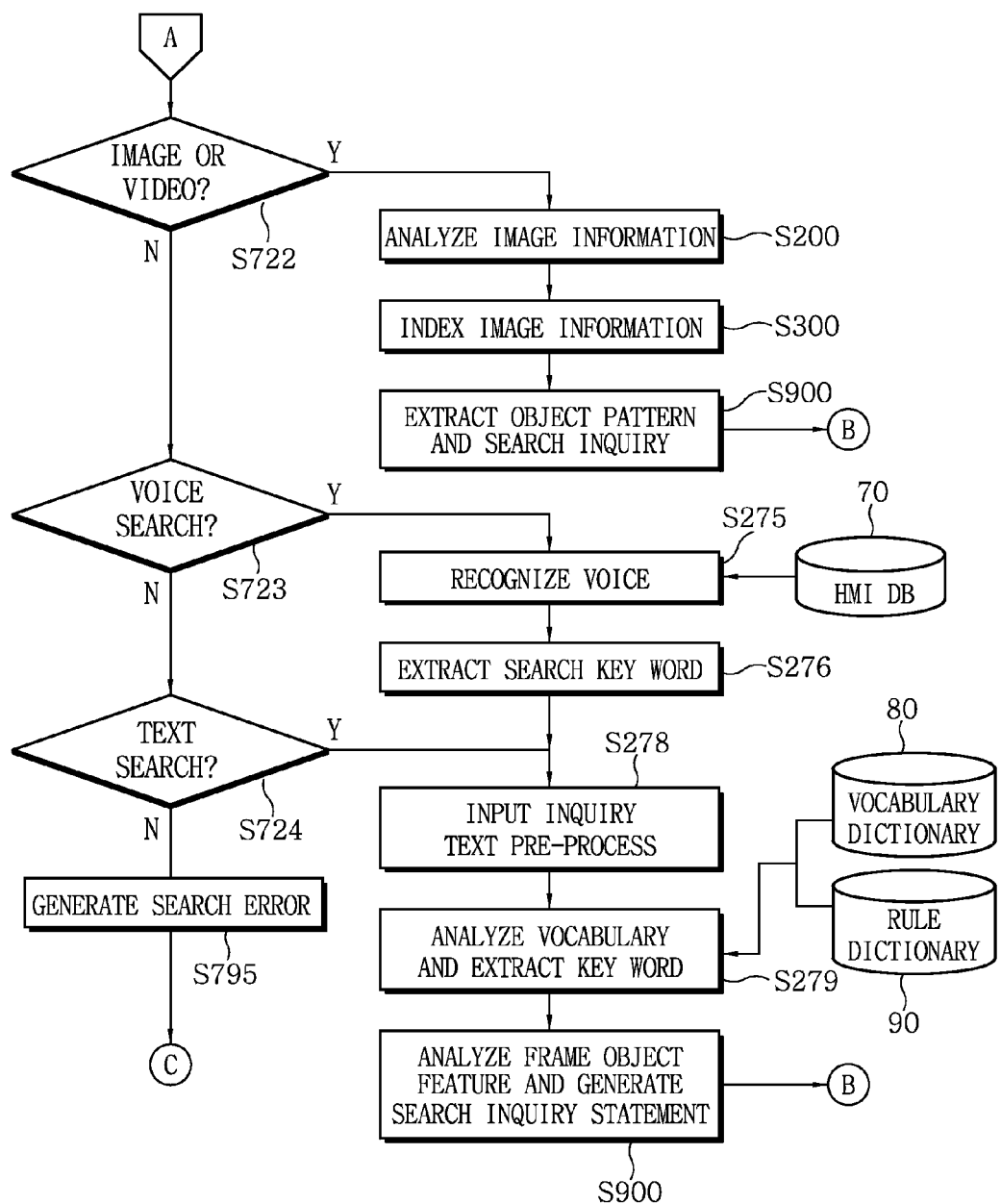
FIG. 20 is a flow chart of binary inquiry process according to an embodiment of the invention.

At this time, in analysis of data type in the binary input (S721), a process following 'A' in FIG. 20 is called.

The inquiry data format interpretation step (S740 and S751) interprets message types of the message data format in Table 4 and transfer values such as cell IDs and payloads and follows a process based on input values.

A service code is generated (S760 and S761) by searching object information located in a specific region from index values in the frame table 30 in the inquiry search data and searching a service anchor 73 corresponding to an object index value of Equation 3b in the corresponding object table 40 and sub object table 50.

At this time, it is determined whether or not an additional input is required in searching the service code, an additional control command option input is received from the terminal (S780), a service code is searched by comparing the received input with a value of condition information required in the search index DB F40, and the searched service code is used to perform a search procedure (S790) for a corresponding service of the service DB F60 based on control command information conditions.

FIG. 20 is a flow chart of binary inquiry process according to an embodiment of the invention. First, analysis of a binary process a binary inquiry input.

At this time, if a type of the inquiry data is an image-based inquiry, an object pattern is extracted through image information analysis (S200) and image information indexing (S300), and a search inquiry is generated (S291).

Here, an inquiry through an image or video is for searching or extracting a context of a similar image or video. For example, a specific image is inquired of a sever to search a scene or frame similar to the specific image. In this case, an inquiry may be made by designating a specific object in an image or scene.

In addition, if the binary inquiry input is a voice search inquiry (S723), voice recognition is performed (S275). At this time, HMI (Human-Machine Interface) DB 70 is referenced to perform voice recognition transmitted from the terminal and extract a voice keyword (S276).

In the binary inquiry data attribute analysis step, if the binary inquiry input is a text-based search inquiry, an input inquiry text pre-process is performed (S278).

The text pre-process (S278) includes word division of an input inquiry statement, distinguishment between a stem and an ending of a word, etc.

Vocabulary analysis and key word extraction is performed with reference to a vocabulary dictionary and a rule dictionary (S279). At this time, with reference to extracted vocabulary components and attribute feature values and feature values for contexts of adjacent frames and object attributes of the frames in inquiry generation in the terminal, vocabulary components having similarity are weighted.

The weighting process in the text search means that this process extracts a rule of extracting, as a key word, a feature of a vocabulary word existing in a text inquiry word made by a user by searching object feature information of the nearest-neighbor frame in generation of a text-based inquiry word in the terminal.

In the step of extracting the key word and its accessory words, it is preferable to compare and extract features of included objects by referring to a scene context 28 of the scene segmentation table 20 and a frame context 34 of the frame table 30 in order to generate (S291) a search inquiry statement in consideration of similarity with feature components of neighboring frame objects at the point of time of text inquiry.

A result of the above inquiry for search is used to interpret inquiry request information through 'B' of FIG. 19 for search performance (S790).

In the above binary search, if there occurs an unrecognizable inquiry which is not included in any of image, video, voice and text search inquiries, an error code for the request inquiry is generated (S795) and is transmitted to the terminal through 'C' of FIG. 19.

Figure 21:
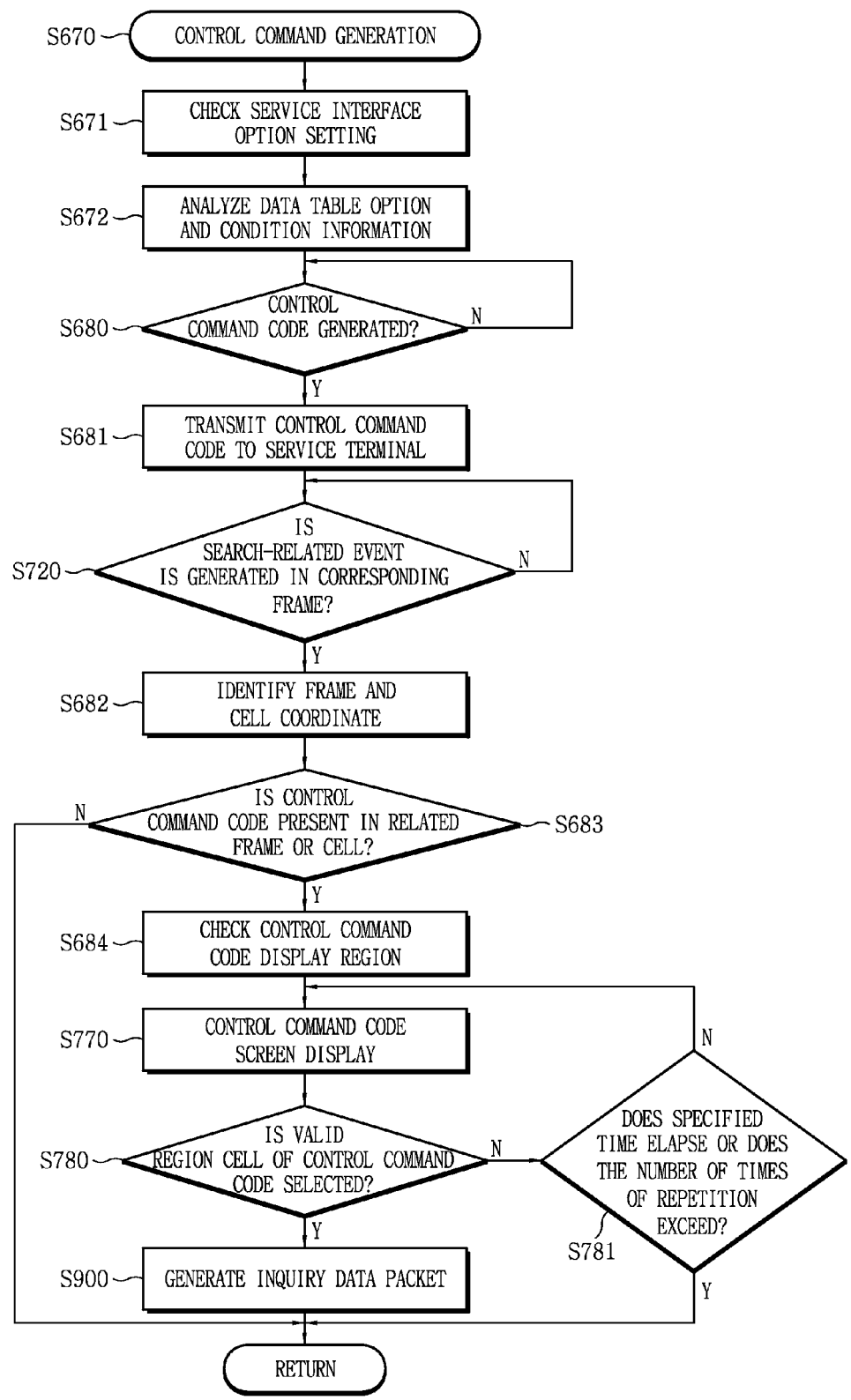
FIG. 21 is a flow chart of terminal control command generation and process according to an embodiment of the invention.

FIG. 21 is a flow chart of the terminal control command generation and process of FIG. 19. Typically, the control command serves to dynamically provide a variety of search options from a video or an image.

Preferably, the provision of the dynamic search options includes a step of storing search option information to be provided for a scene in a table, frame or object; a step of searching and confirming stored control command option information (S671); a step of extracting and transmitting a control command required fro a corresponding video (S680, S681); a step of displaying the control command on the terminal (S770); a step of selecting the control command information in a frame or object search (S780); and a step of interpreting selected control command cell or frame information and generating an inquiry data format (S900).

Preferably, the step of storing search option information in a table is defined in the scene segmentation table 20 the frame table 30, which are shown in FIG. 2, the object table 40 and the sub object table 50, and parameters and operation conditions of defined detailed control commands are defined in the control command table F20, the object index DB F0 and the service DB F60, which are shown in FIG. 4.

The step of searching and confirming stored control command option information involves confirming (S671) provision conditions of the defined control command information and option setting information and making environment analysis (S672) to provide a control command code according to a frame to be provided.

Through this step, a control command code is generated (S680). In this case, for a video, the generated command code is transmitted (S681) with a specific period or as a general control command code when image information is provided fro the server to the terminal.

The control command code transmitted to the terminal identifies frame and cell coordinates (S682) if there is a search request (S720) using a pointing device, a search word input or a binary search method during video play. Then, control command data corresponding to a relevant frame or cell are checked (S683) to set a region in which control command option information is displayed in order to dynamically assign a user with a provided information region or any region in the terminal.

Figure 22:
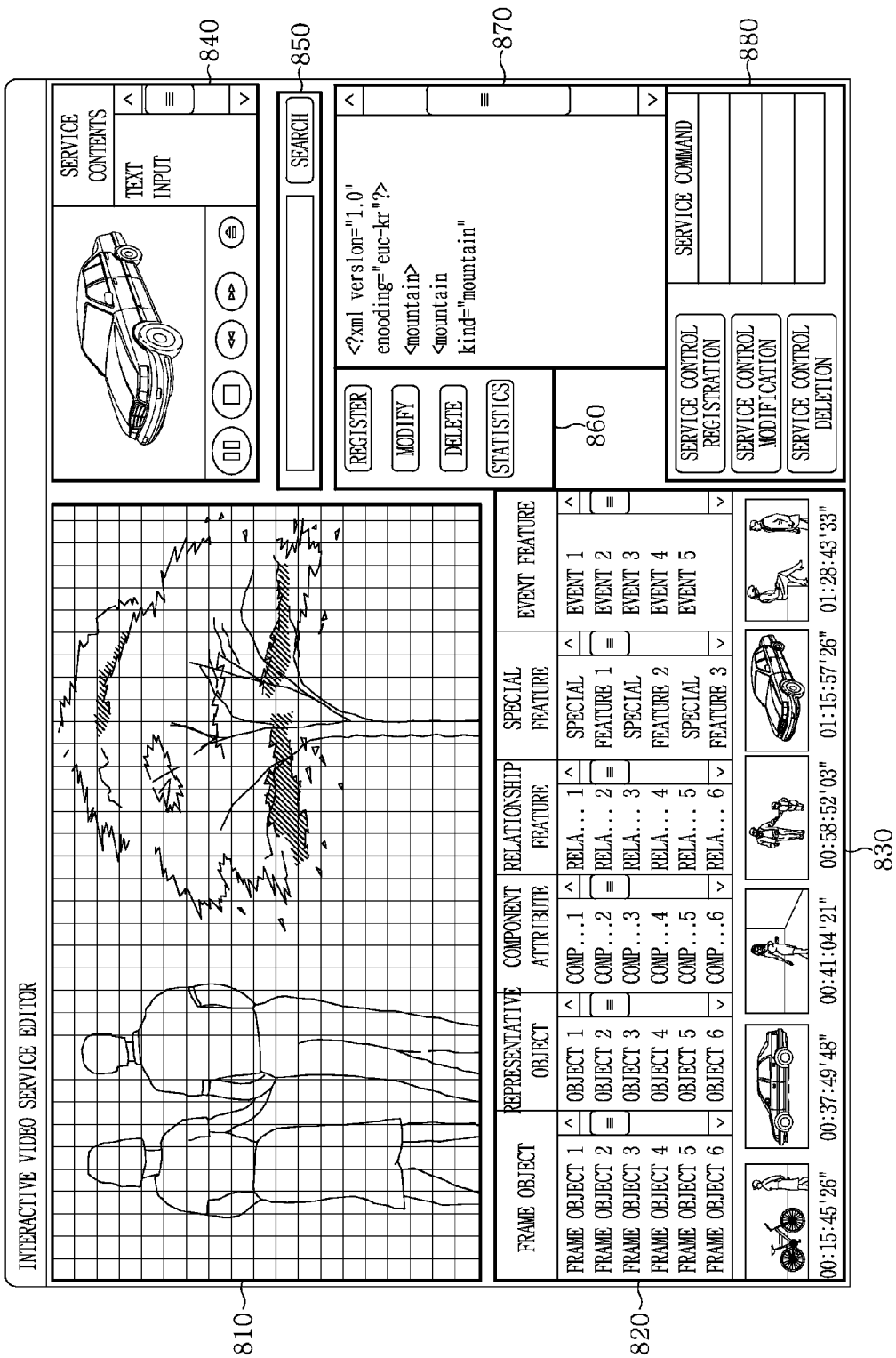
FIG. 22 is a view showing an example of a service editor for metadata, feature information and service management according to an embodiment of the invention.

FIG. 22 is a view showing an example of a service editor. The service editor includes an image display region 810; a frame and object attribute and feature management region 820; a scene segmentation display region 830; an image service preview and edition management region 840; an object and frame search region 850; an attribute, feature and service edition and management region 860 and 870; and a control command code management region 880.

In the image display region 810, an object identification area is displayed in a frame cell segmentation area. A feature of an object identified in a cell area may be input, modified or deleted in the attribute and feature management region 820.

The scene segmentation display region 830 shows segmented portions of a scene of an image as scene starts. A feature or attribute may be designated for each selected scene and may be used for the entire service connection and edition.

The image service preview and edition management region 840 is an interface screen for check of suitability of an edited image service or feature provision.

The object and frame search region 850 is a frame and object matching information search region for a representative object, title, context and caption index.

The attribute, feature and service edition and management region 860 and 870 is used to check registration, modification, deletion and service statistics of contents of frame feature attribute information, object feature information and service connection information edited and modified in the image display region 810 and the frame and the object attribute and feature management region 820, and to manage generation information written with a markup language such as, for example, an XML (xXtensible Markup Language), for the generated feature and attribute information and service mapping information.

The control command code management region 880 is an edition screen for displaying a variety of information or interface required to provide a service on a screen or an image.

Figure 23:
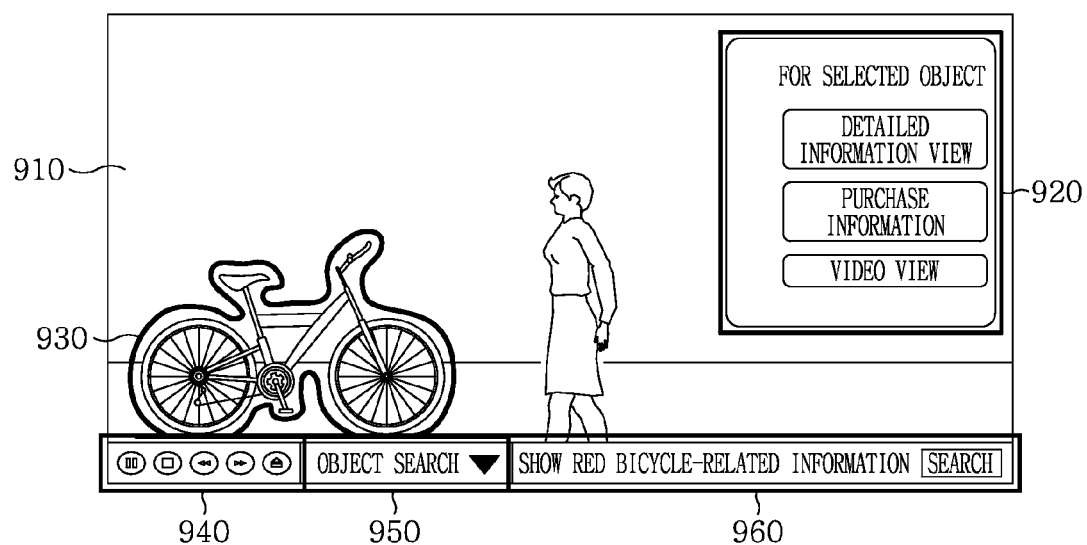
FIG. 23 is a view showing a video service interface of a user terminal according to an embodiment of the invention.

FIG. 23 is a view showing a video service interface of a user terminal according to an embodiment of the invention.

As shown, the video service interface includes a control command display interface 920, an object selection interface 930, a video control interface 940, a search category selection section 950 and a search window 960.

The control command display interface 920 is preferably set in a variety of regions rather than a fixed region, according to setting of the user terminal or in consideration of positions of the object selection region.

Figure 24:
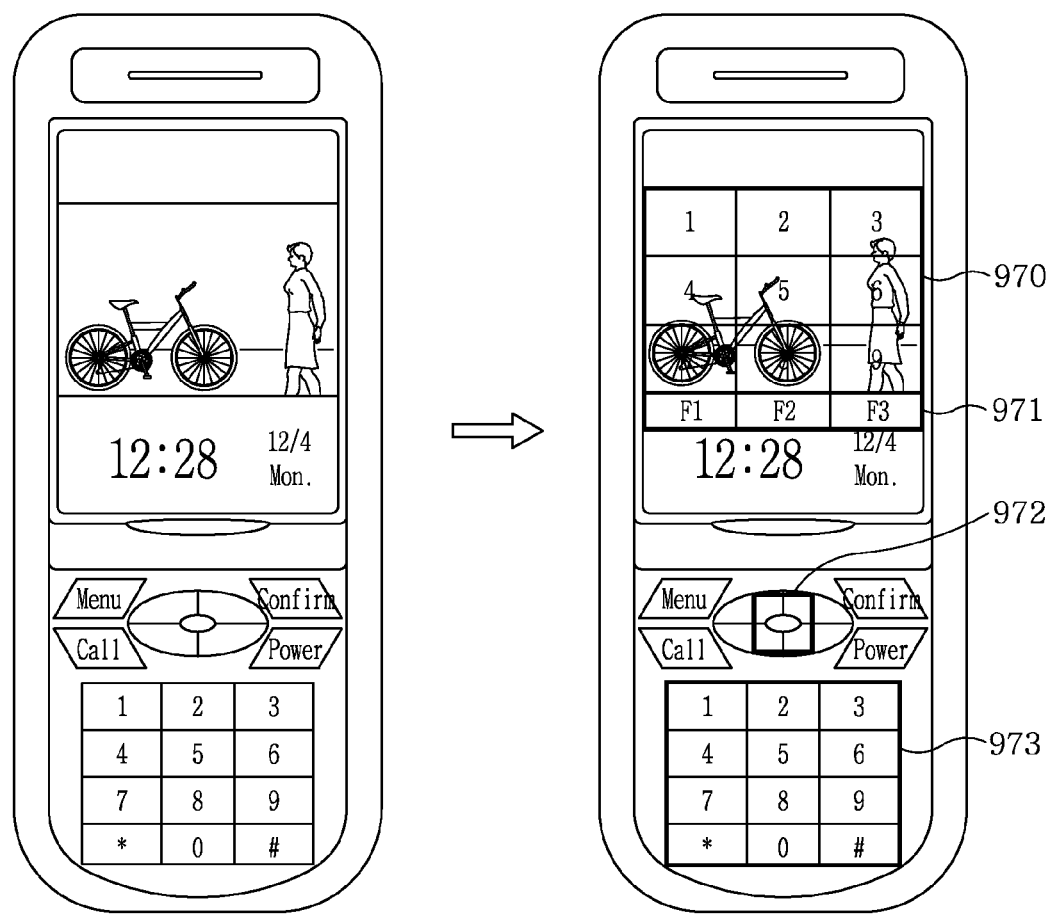
FIG. 24 is a view showing an interactive image search terminal using a mobile terminal according to an embodiment of the invention.

FIG. 24 is a view showing an example service of a search terminal using a mobile terminal. The shown mobile terminal includes an image display section 970, a control command display section 971, a pointing device 972 and a numeric pad and cell region mapping display section 973. In a mobile terminal, a pointing device such as a mouse required to select a region in picture or image information may be limited or may have a trouble. For this reason, a mapping of region to a numeric pad for a virtual cell region for a display image may be set, through which a variety of functional interfaces may be integrated.

If a corresponding numeral (for example, 3) of a key pad for a picture or image provided to the image display section 970 is input, a region '3' in the right and upper portion of the image display section is selected and an object or service in the region '3' is searched and provided. In a case of a mobile terminal having a touch screen, the above search request is possible when a corresponding region is pointed.

The control command display section may be additionally assigned with keys, "*", "0" and "#" in order to provide several control command interface functions.

Meanwhile, as described above, the object indexing method of the invention sets a segmentation depth and the number of segmentations of an image suitably, analyzes a cell, segments the cell into sub cells if analysis attribute values of the cell are different, and perform repetitive analysis and segmentation the identical attribute value or an attribute value having a predetermined ratio is extracted.

However, the above-mentioned image analysis procedure has a problem of identical repetitive analyses due to a successive repetitive segmentation and analysis procedure.

Accordingly, an image analysis pre-process for image analysis is first performed to extract a background, a contour line, and a set of objects. This pre-process includes a procedure where a region having identified objects is mapped to a virtual cell region, a target cell is segmented into sub cells, and analysis values ones extracted among the sub cells are compared with an attribute value of the nearest cell to determine whether or not they are equal to each other.

In addition, as described above, in the present invention, for object identification, each cell is segmented into a predetermined number of sub cells, a reference cell is analyzed and segmented until it can be split by a preset segmentation depth through analysis of an attribute of the corresponding cell, and then identical attribute information is merged to be identified as one object. In this method, the segmentation procedure is repeated until identical analysis information is obtained, values of adjacent cells of the segmented sub cells are compared, and if equal, the sub cells are identified to be the same object: however, this method may have a limitation of an error of object identification.

Accordingly, this can be improved through the above-described image analysis pre-process.

Figure 25:
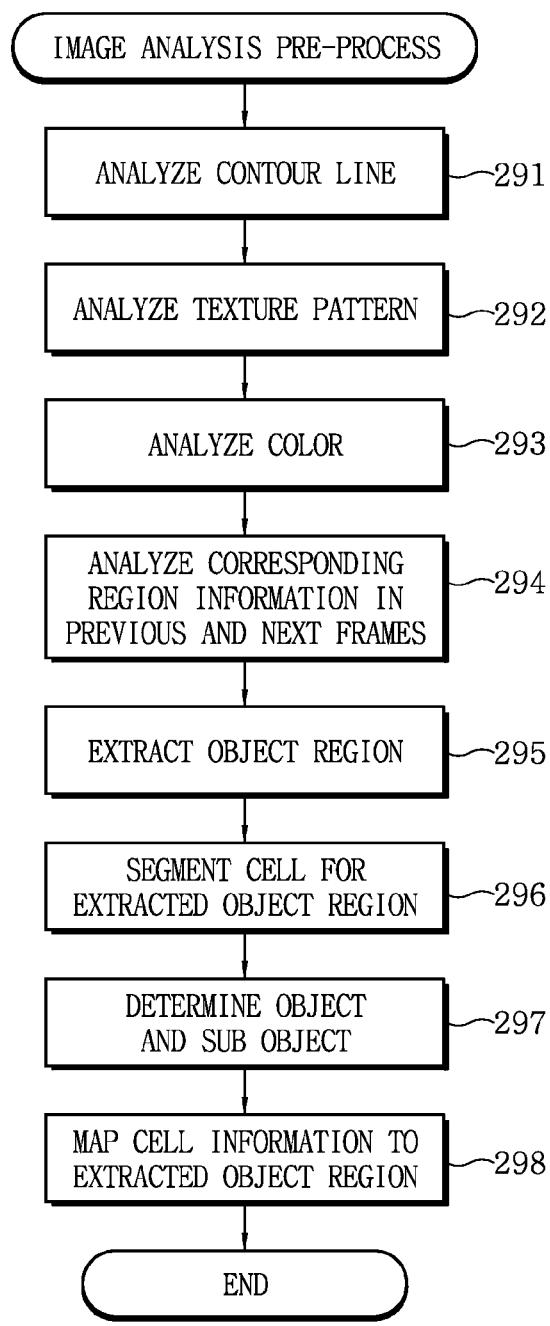
FIG. 25 is a flow chart of image analysis pre-process according to an embodiment of the invention.

FIG. 25 is a flow chart of image analysis pre-process according to an embodiment of the invention.

A contour line is first analyzed (291), a texture pattern is analyzed (292), and a color is analyzed (293). Then, an object region is extracted (295) through corresponding information analysis (294) in previous and next frames. Such a procedure is performed as shown in FIGS. 19 to 21.

Next, cell segmentation is performed (296) for the extracted contour line region (region including objects) and objects and sub objects are determined (295). To this end, cell information mapping for the extracted object region is performed (298).

Figure 26:
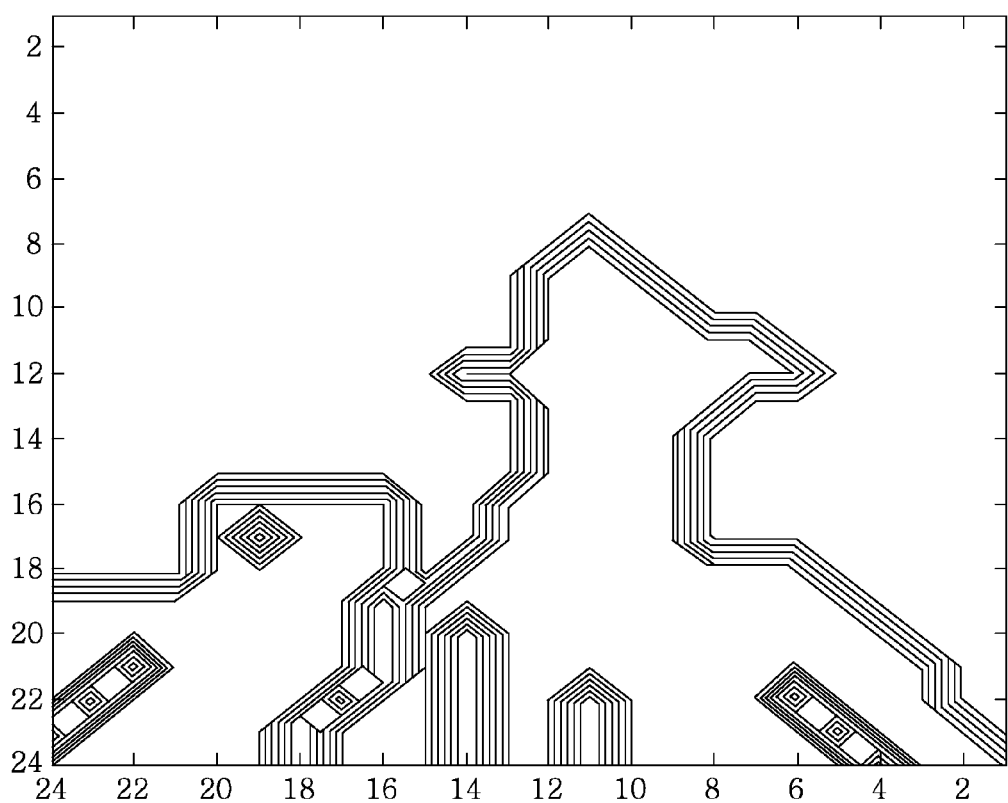
FIG. 26 is a view showing image contour line analysis according to an embodiment of the invention.
Figure 27:
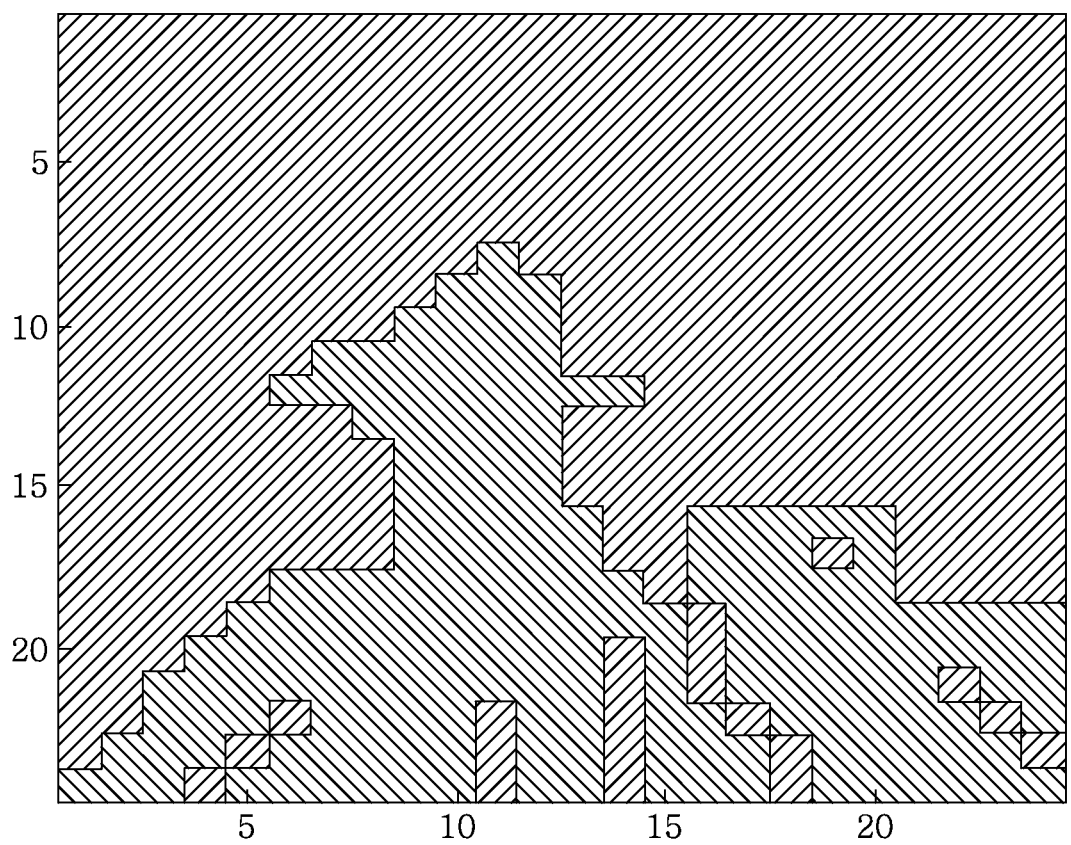
FIG. 27 is a view showing a region in which an object in an image is identified according to an embodiment of the invention.

FIG. 26 is a view showing image contour line analysis according to an embodiment of the invention, FIG. 27 is a view showing a region in which an object in an image is identified according to an embodiment of the invention, and FIG. 28 is a view showing per-cell mapping of a region in which an object in an image is identified according to an embodiment of the invention.

Hereinafter, a method of constructing a database for the above-described polygon model will be described with reference to FIGS. 29 and 30.

Figure 29:
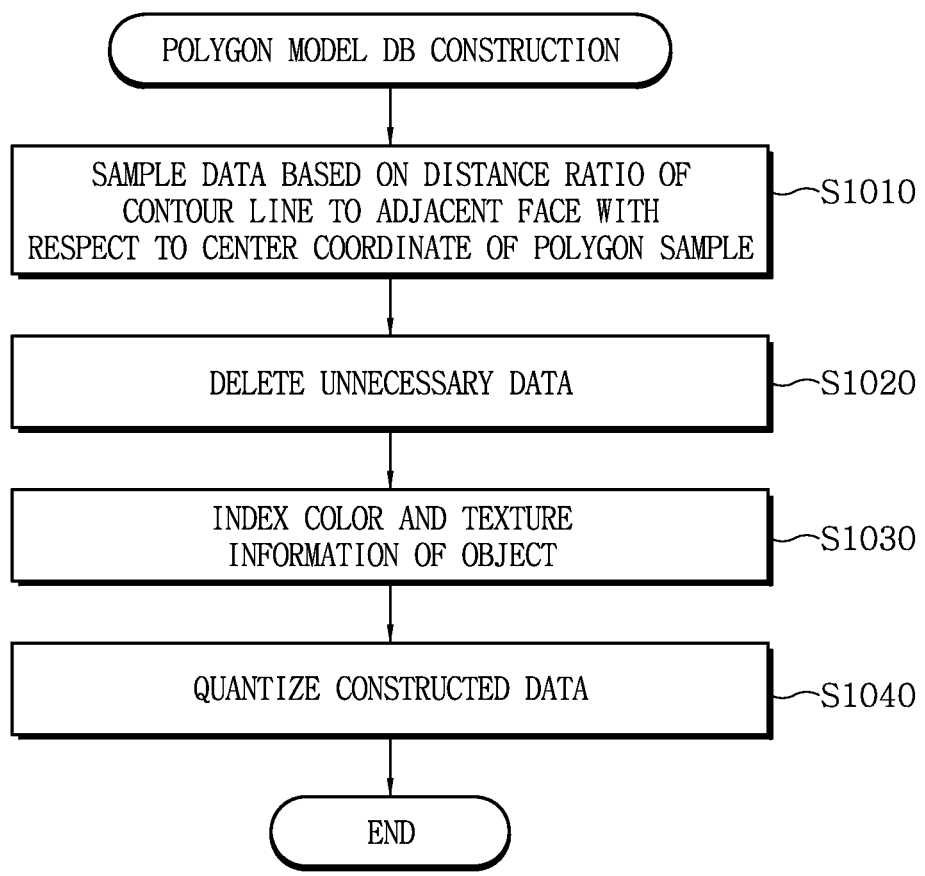
FIG. 29 is a flow chart of polygon model DB construction according to an embodiment of the invention.

FIG. 29 is a flow chart of polygon model DB construction according to an embodiment of the invention.

First, polygon sample data are constructed. This is achieved by sampling (S1010) data based on a distance ratio of a contour line to an adjacent face with respect to a center coordinate of a sample. Then, unnecessary data (sharp cut sections and so on) are deleted (S1020), and color and texture information of an object such as skin or hair is indexed (S1030).

Finally, the constructed data are quantized (S1040) to construct a polygon model database.

A procedure to identify objects using the constructed polygon model database is as follows.

Figure 30:
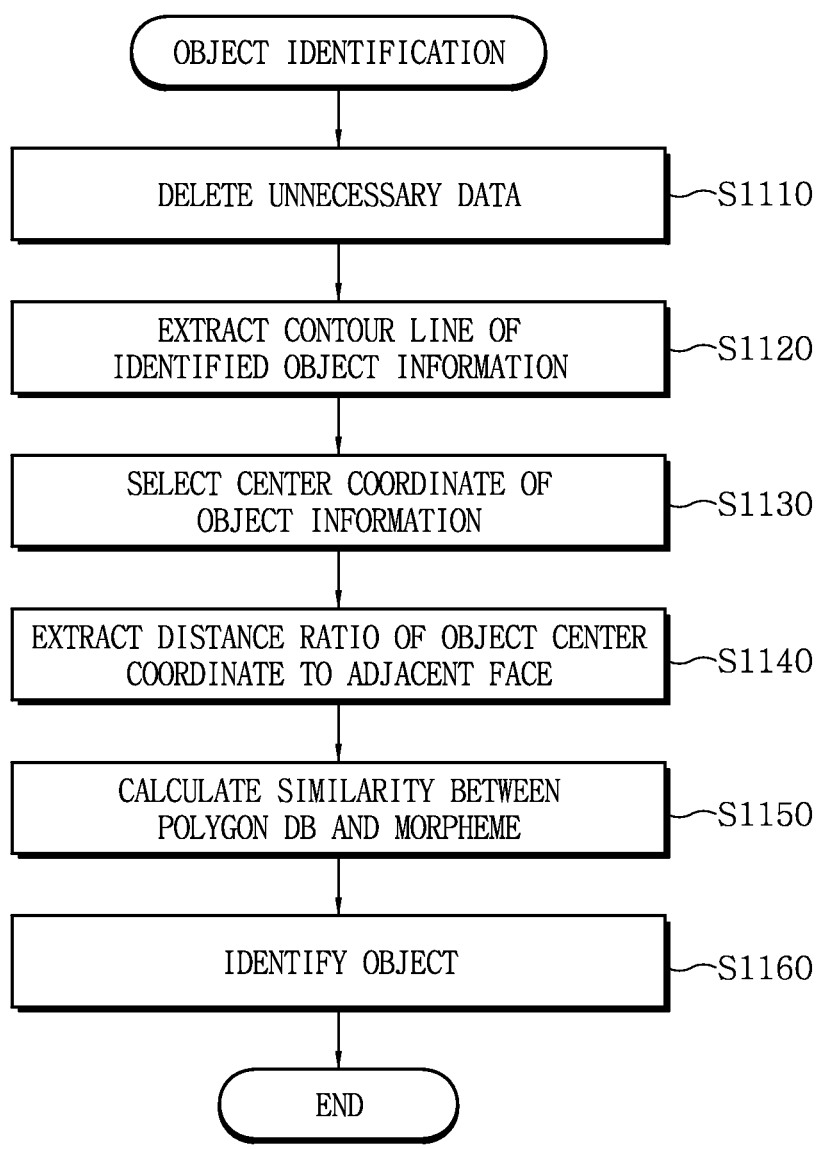
FIG. 30 is a flow chart of object identification according to an embodiment of the invention.

FIG. 30 is a flow chart of object identification according to an embodiment of the invention.

First, unnecessary data are deleted (S1110) and a contour line of identified object information is extracted (S1120). Then, a center coordinate of the object information is selected (S1130) and then a distance ratio of the object center coordinate to an adjacent face is extracted (S1140).

Finally, similarity between the polygon DB and morpheme is calculated (S1150), thereby completing an object identification procedure (S1160).

While it has been illustrated in the above that, for scene segmentation, a scene segmentation interval is set based on determination on variation information similarity between reference frame analysis information and target frame analysis information, the scene segmentation may be additionally carried out according to the following method.

The scene segmentation may be determined along with variation information of attribute information of objects in a frame and variation information of read voice (if any) in an image.

The determination information of an object may be determined based on similarity of background information from a start frame, whether or not repetition between frames of a detected object is maintained, or similarity of voice analysis information. At this time, the detected object means that image information analysis attribute has the sameness or similarity.

Next, a feature of a background screen is extracted in an interval frame. This feature information of the background screen means analysis information of fields, buildings, streets, fixtures of indoor background, furniture, brightness and so on, and may include texture information, color information and so on.

Meanwhile, as described above, the generated data format obeys a packet rule in a communication network and includes a protocol identifier, a session ID, a message type, a reserved field, a video ID, a frame ID, a cell ID and a payload length field, which are common header portions of the packet. The payload field may include a user ID, a natural language inquiry text or voice inquiry data, an authentication code, etc.

As another embodiment, an input inquiry data frame may be inserted in an image frame, independent of the method of generating the search inquiry data separately from the image.

When the separate input inquiry data are constructed, the above-described method has a difficulty in providing an integrated service to a diversity of terminals. That is, it is difficult to apply the same connection and communication scheme to all of service servers and terminals. To overcome this difficulty, a data frame may be inserted in a frame and may be subjected to a procedure to check and process the data frame using a separate identifier to identify a header in an image decoder, separately from the image processing.

Referring to FIG. 31, a service profile generation table is added and a service profile is associated with a data frame in order to provide a variety of services for search inquiry. That is, as shown, this table has an object indexing structure including a data frame configuration including object indexes, contexts, control commands and so on.

Figure 32:
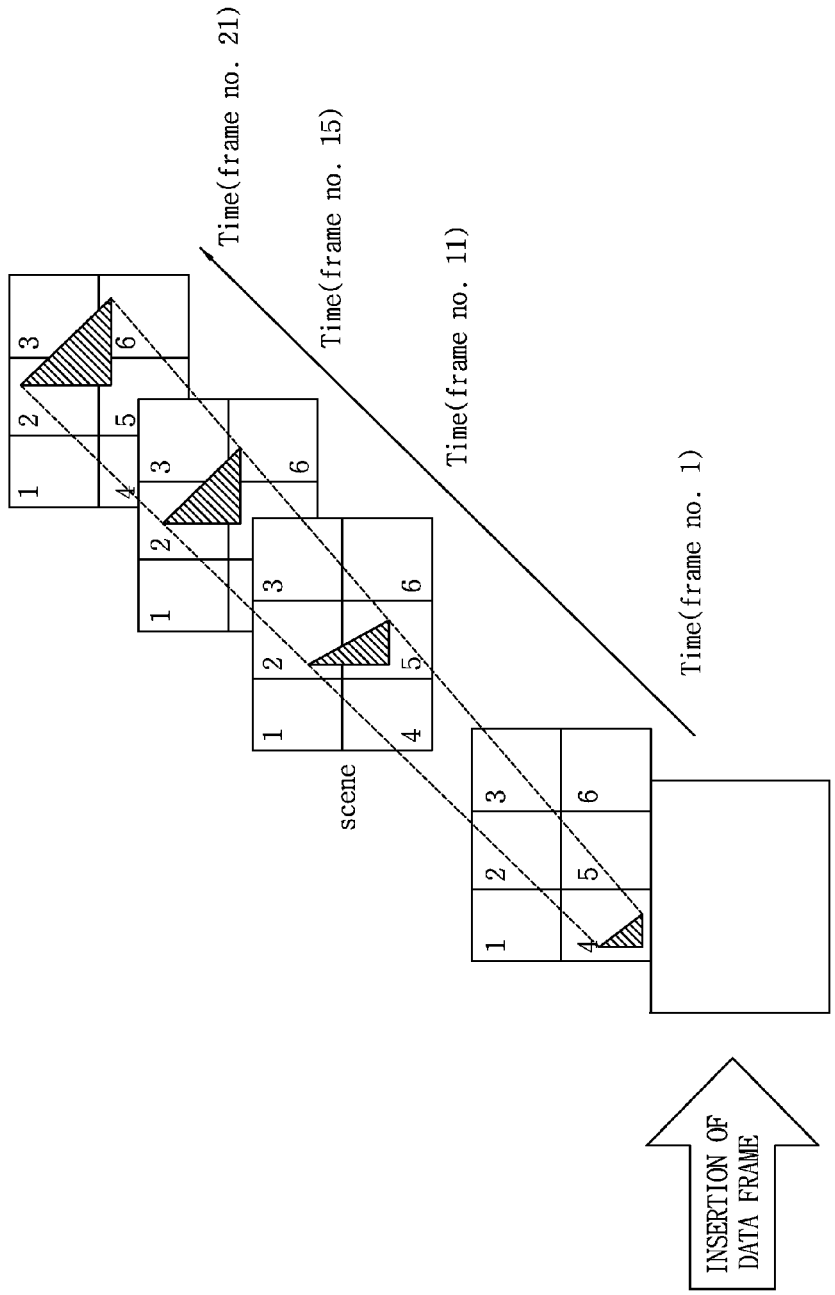
FIG. 32 is a view showing an example of insertion of a data frame in an image frame according to an embodiment of the invention.

FIG. 31 is a view showing a data frame structure inserted in an image frame according to an embodiment of the invention, and FIG. 32 is a view showing an example of insertion of a data frame in an image frame according to an embodiment of the invention.

While the present invention has been particularly shown and described with reference to exemplary embodiments thereof, it will be understood by those skilled in the art that various changes in form and details may be made therein without departing from the spirit and scope of the present invention as defined by the appended claims and equivalents thereof.

What is claimed is:

1. A system for providing a supplementary service by identifying an object in an image, comprising:
    an image service server which provides image information and includes a database that manages metadata for provision of the service; and
    a user terminal which dynamically generates control command information according to information for an object selected in the image, receives the information for the object selected in the image that is displayed on a screen, transfers the information to the image service server, and receives from the image service server a preset supplementary service that corresponds to the information for the object selected, wherein the image service server include: an input unit which receives the image information; a video conversion unit which encodes or converts the input image information into an appropriate format and stores the encoded or converted image information in an image information storage unit; an information indexing unit which detects object information from the stored image information and matches a frame of image information in the image information storage unit with object region and connection information within the frame; the image information storage unit which stores image information including the object information, cell information which is screen segmentation information of each image, and feature attribute and service link information in an object; an index information management unit which manages a hierarchical relationship between the object information and metadata of the object information; and an object feature registration unit which manages, provides and processes features and attribute values of the object information.

2. The system according to claim 1, wherein the image service server includes:
    an object feature information management database;
    an index and service information management database; a service registration unit which connects a variety of services to an image and manages a mapping;
    a search provision unit which searches the image information storage unit based on a variety of request information;
    a service request interpretation unit which interprets and processes a service request;
    a result output unit which extracts and processes a search result to transmit the search result to the user terminal;
    a network connection unit which provides an interfacing with a communication network; and
    a control unit which controls operation of the units.

3. The system according to claim 1, wherein the image information storage unit stores object identification information, image identification information including the object, configuration cell information including identification information of each of segmentation cells constituting the object, information on an area, center point coordinate and phase shift, and simple object information including an image attribute.

4. The system according to claim 3, wherein the image information storage unit constructs an object feature database and a process rule database as an electronic dictionary in order to store metadata for the image information and stores simple object metadata information including object identification information, image identification information including the object, classification information of the object, link information of the object, object detailed information and motion information according to an event.

5. The system according to claim 1, wherein the image information storage unit stores image identification information, identification information of a cell which is the unit of screen segmentation for the image, and cell segmentation information including start and end coordinates of a corresponding cell, along with corresponding image information.

6. The system according to claim 1, wherein the image information storage unit stores logical object information including logical object identification information, image identification information including the logical object, classification information of the logical object, identification information about simple objects included in the logical object, and motion information according to an event.

7. The system according to claim 1, wherein the information indexing unit detects relative positions of objects included in the image and stores simple object information including positions and image information of the objects represented by cell information.

8. The system according to claim 1, wherein the information indexing unit detects a basic screen size for the image, segments the screen into a plurality of virtual cells based on preset segmentation information, analyzes image information of each of the virtual cells, recognizes a set of adjacent cells of the cells having the same analysis information as one object, and stores recognized simple object information of each of the objects.

9. The system according to claim 7, wherein the information indexing unit connects an index keyword extracted through a language processing and analysis procedure from caption or related document information to a video frame and object information and includes object feature information and semantic information including a corresponding cell.

10. The system according to claim 1, wherein the index information management unit receives simple object associated information from metadata for each simple object and stores hierarchical information including virtual logical objects generated by a simple object hierarchical structure.

11. The system according to claim 10, wherein the metadata of the logical objects include screen pixel position mapping information for the virtual cells of objects, object attribute and feature information of the objects, and feature attribute information required for extraction of linkage information between the objects.

12. The system according to claim 1, wherein the service registration unit generates metadata using image frame analysis image information, detected object cell information, polygon information and object feature information and stores a result of extraction of contexts of objects, frames and scenes.

13. The system according to claim 1, wherein the service request interpretation unit interprets a type of input request information having means of object selection, inquiry input and voice input and performs a procedure of pointing and inquiry word and voice recognition based on a result of the interpretation.

14. The system according to claim 1, wherein the user terminal includes: an image display unit which includes a display screen segmented into cells and outputs the display image information; a search information input unit which provides a plurality of input means; an input information interpretation unit which generates a message data format for input information; an input information generation unit which generates inquiry data for inquiry intention input; a network connection unit which provides an interfacing with a communication network; and a result output unit which outputs a result transmitted from the image service server.

15. The system according to claim 14, wherein the input information input to the input information generation unit includes one or more selected from a group consisting of an image identifier; a frame identifier or time information; cell information of an object position; control command selection information, and binary inquiry input information including key words, voice and images.

16. The system according to claim 1, wherein the system provides a supplementary service related to the object selection information included in the image by inserting a separate input inquiry data frame in the image frame.

17. The system according to claim 16, wherein the input inquiry data frame adds a service profile generation table.

18. The system according to claim 16, wherein the input inquiry data frame is configured to include an object index, a context and a control command.

19. A method of indexing objects in an image, comprising:
an image information search step of checking whether or not newly registered image information is present;
an image information analysis step of analyzing a video format and screen information for the newly registered image information;
an image information indexing step of analyzing image information from the analyzed original image information and indexing extraction information with cell regions;
a step of performing an image analysis pre-process through a contour line analysis method to extract a background and contour lines;
a step of mapping an object identification region to a virtual cell region based on the extraction; and
an object identification step of segmenting the object identification target cell into sub cells and identifying one or more objects included in the original image information.

20. The method according to claim 19, wherein the image information search step includes:
checking whether or not there is analysis target image information in an image information repository;
checking whether or not an indexing target video is present; and
if it is checked that an indexing target video is present, determining whether or not a video format and a codec are supported, selecting a corresponding codec, and analyzing the video.

21. The method according to claim 19, wherein the image information indexing step includes:
analyzing an image of a frame extracted from an image;
mapping image pixel information to a virtual cell region;
analyzing image pixel image information assigned to the virtual cell; and
identifying a set of adjacent cells among cells with the same image analysis information as one object.

22. The method according to claim 21, further comprising:
after the identifying step, analyzing the object identification information and indexing the analyzed object identification information as an object;
segmenting a scene using analysis information of objects and a background identified using image identification information of an image frame; and
storing an analysis result in a storage table.

23. The method according to claim 19, wherein the image information analysis step further includes: detecting a screen size based on pixel information of an image screen;
extracting pixel units compatible with segmentation from the screen size including screen width and height based on preset segmentation information;
assigning a cell region of a virtual analysis table in order to manage image analysis information; and
mapping pixel segmentation information of an image to cell information.

24. The method according to claim 23, wherein the number of segmentation of virtual cell corresponding to the frame is a multiple of an integer.

25. The method according to claim 21, wherein the step of analyzing image pixel image information assigned to the virtual cell further includes:
extracting a frame for image analysis according to a predetermined rule;
analyzing a pixel coordinate region segmented from the extracted frame using the cell mapping information based on analysis information of color, texture and boundary line;
if a plurality of analysis information is present in one selected cell, segmenting the cell into a multiple of two of sub cells; and
segmenting and analyzing the sub cells by a specified segmentation depth until a single image analysis attribute is detected.

26. The method according to claim 25, wherein a result of the image analysis is stored as image analysis information of color, texture and boundary line information and single analysis determination information, and is determined as single analysis information even if there exist a plurality of analysis information when the lowest level sub cell analysis approaches a single object determination ratio in the storing procedure.

27. The method according to claim 19, wherein the object identifying step further includes:
analyzing any cell information in frame image analysis information;
determining whether or not the object is a cell having continuous adjacent planes and has the same image analysis attribute information;
extracting a polygon from cell determination information; and
analyzing an object attribute from the extracted polygon to determine a simple object.

28. The method according to claim 27, wherein, in managing per-frame object identification information, the object identification information in a virtual cell region is stored as binary summary information, and a connection angle between adjacent successive cells and a relative distance between vertexes at which angle variation occurs are calculated for object identification.

29. The method according to claim 19, wherein the image analysis pre-process is analyzed based on one or more selected from a group consisting of a contour line, a texture pattern and a color of a target image.

30. A method of indexing objects in an image, comprising:
an image information search step of checking whether or not newly registered image information is present;
an image information analysis step of analyzing a video format and screen information for the newly registered image information;

an image information indexing step of analyzing image information from the analyzed original image information and indexing extraction information with cell regions;

an object identification step of identifying one or more objects included in the original image information based on a constructed polygon model; and a feature provision step of providing an attribute each identified object.

31. The method according to claim 30, further comprising:
after the feature provision step, a service profile generation step of generating a service profile for each object provided with the attribute.

32. The method according to claim 31, further comprising:
after the service profile generation step, a service provision step of searching and providing a corresponding service at a service request for each object for which the service profile is generated.

33. The method according to claim 30, wherein the object feature attribute is one selected from a group consisting of a representative object feature including a unique representative attribute classification of objects, a general attribute feature of a representative object, a relationship attribute feature between objects or between objects and sub objects, a component attribute feature including behavior, time, place, accessory and condition components of objects, and a special feature to define a special or unique attribute value of an object.

34. The method according to claim 30, wherein the feature provision step further includes:
providing a representative object feature value, a general attribute feature and a component and relationship feature to analysis object information for an extracted object in a frame and providing a feature in a special feature order if the object needs a special feature;
providing a feature value based on index similarity between image analysis information and a polygon; and
if a feature valued is provided to all detected objects in the same frame, providing a feature value for a background object.

35. The method according to claim 34, further comprising:
after the step of providing a feature value, determining whether or not the provided feature value is appropriate or a unregistered object;
managing the object attribute feature as a pattern of feature set; and
processing the feature attribute value to determine the presence of a feature attribute of a detailed item for a corresponding feature classification item.

36. The method according to claim 35, wherein the presence of a feature attribute of a detailed item manages a feature attribute as a binary value.

37. The method according to claim 35, wherein a calculating method based on the feature includes:
a step of determining the presence of detailed feature items per object feature classification;
a step of applying an association processing rule between objects or between objects and accessory sub objects of the objects; an association rule processing step between a plurality of objects and a plurality of object features; and
a situation and event identification step based on a pattern matching calculation rule for a feature pattern between a plurality of objects.

38. The method according to claim 37, wherein a processing rule database for the feature-based calculation sets a feature pattern extraction condition between a plurality of objects, applies a processing algorithm based on an extraction feature pattern in order to analyze an association between attribute features, recognize a situation and process a variety of supplementary services, and defines an algorithm processing generation rule based on a feature pattern condition.

39. The method according to claim 31, wherein the service profile generation step includes motion information for each condition in order to call service call result processing information, motion information and a particular context related to the object detected in the indexing step.

40. The method according to claim 30, wherein a method of constructing the polygon model database includes the steps of:
constructing sample data of the polygon by sampling data based on a distance ratio of a contour line to an adjacent face with respect to a center coordinate of a sample;
deleting unnecessary data; indexing color and texture information of an object such as skin or hair; and
quantizing the constructed data.

41. The method according to claim 30, wherein the object identification step includes: deleting unnecessary data; extracting a contour line of the identified object information; selecting a center coordinate of the object information and extracting a distance ratio of the object center coordinate to an adjacent face; and calculating similarity between a polygon DB and a morpheme.

* * * * *